US007643675B2

(12) United States Patent
Evans et al.

(10) Patent No.: US 7,643,675 B2
(45) Date of Patent: Jan. 5, 2010

(54) STRATEGIES FOR PROCESSING IMAGE INFORMATION USING A COLOR INFORMATION DATA STRUCTURE

(75) Inventors: Glenn F. Evans, Kirkland, WA (US); Stephen J. Estrop, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 859 days.

(21) Appl. No.: 10/902,325

(22) Filed: Jul. 29, 2004

(65) Prior Publication Data
US 2005/0024384 A1 Feb. 3, 2005

Related U.S. Application Data

(63) Continuation-in-part of application No. 10/694,144, filed on Oct. 27, 2003, now Pat. No. 7,139,002.

(60) Provisional application No. 60/492,029, filed on Aug. 1, 2003.

(51) Int. Cl.
*G06K 9/00* (2006.01)
(52) U.S. Cl. .................. 382/162; 382/167
(58) Field of Classification Search ........... 382/162, 382/167, 303; 345/501, 522; 348/441, 446
See application file for complete search history.

(56) References Cited

U.S. PATENT DOCUMENTS

| | | | |
|---|---|---|---|
| 4,463,372 A | | 7/1984 | Bennett et al. |
| 4,601,055 A | | 7/1986 | Kent |
| 4,639,763 A | * | 1/1987 | Willis et al. ............... 348/450 |
| 4,866,637 A | * | 9/1989 | Gonzalez-Lopez et al. .. 345/426 |
| 5,014,327 A | | 5/1991 | Potter et al. |
| 5,179,641 A | | 1/1993 | Comins et al. |
| 5,218,674 A | | 6/1993 | Peaslee et al. |
| 5,235,432 A | | 8/1993 | Creedon et al. |
| 5,325,448 A | | 6/1994 | Katayama et al. |
| 5,508,812 A | * | 4/1996 | Stevenson et al. ............. 386/34 |
| 5,565,994 A | | 10/1996 | Eschbach |

(Continued)

FOREIGN PATENT DOCUMENTS

EP          0600204          6/1994

(Continued)

OTHER PUBLICATIONS

Office Action for Malaysian patent application No. PI 20031383 mailed on Oct. 12, 2007.

(Continued)

*Primary Examiner*—Phuoc Tran
(74) *Attorney, Agent, or Firm*—Lee & Hayes, PLLC

(57) ABSTRACT

Strategies are described for processing image information using a data structure which conveys color information. The color information describes color-related formatting applied to the image information. The data structure can be passed down a video processing pipeline, where each functional component in the pipeline can draw color information from the data structure to improve the accuracy of its processing. Further, each component can supply previously unknown color information to the data structure for use by other (downstream) components in the pipeline. Exemplary fields of the data structure can include one or more of: a video transfer function field; a color primaries field; an image light field; a transfer matrix field; a nominal range field; and a video chroma sampling field. The transfer matrix field can be used to convert image information from one color space to another, such as a luma-related color space to an RGB-related color space. Processing operations can be performed on progressive and linear RGB image information.

23 Claims, 17 Drawing Sheets

U.S. PATENT DOCUMENTS

| | | | |
|---|---|---|---|
| 5,577,125 | A | 11/1996 | Salahshour et al. |
| 5,602,943 | A | 2/1997 | Velho et al. |
| 5,715,459 | A | 2/1998 | Celi, Jr. et al. |
| 5,742,797 | A | 4/1998 | Celi, Jr. et al. |
| 5,757,386 | A | 5/1998 | Celi, Jr. et al. |
| 5,793,371 | A | 8/1998 | Deering |
| 5,870,503 | A | 2/1999 | Kumashiro |
| 5,872,956 | A | 2/1999 | Beal et al. |
| 5,892,847 | A | 4/1999 | Johnson |
| 5,898,779 | A | 4/1999 | Squilla et al. |
| 5,936,632 | A | 8/1999 | Cunniff et al. |
| 5,940,141 | A | 8/1999 | Faroudja et al. |
| 5,982,453 | A * | 11/1999 | Willis .................. 348/607 |
| 6,034,733 | A | 3/2000 | Balram et al. |
| 6,047,295 | A * | 4/2000 | Endicott et al. ......... 707/206 |
| 6,064,739 | A | 5/2000 | Davis |
| 6,072,873 | A | 6/2000 | Bewick |
| 6,144,390 | A * | 11/2000 | Ensor .................. 345/473 |
| 6,195,098 | B1 | 2/2001 | Brittain et al. |
| 6,205,492 | B1 | 3/2001 | Shaw et al. |
| 6,208,350 | B1 | 3/2001 | Herrera |
| 6,212,574 | B1 | 4/2001 | O'Rourke et al. |
| 6,246,768 | B1 | 6/2001 | Kim |
| 6,262,773 | B1 | 7/2001 | Westerman |
| 6,269,484 | B1 | 7/2001 | Simsic et al. |
| 6,295,068 | B1 | 9/2001 | Peddada et al. |
| 6,307,559 | B1 | 10/2001 | Hancock et al. |
| 6,317,165 | B1 | 11/2001 | Balram et al. |
| 6,323,875 | B1 | 11/2001 | Millman et al. |
| 6,329,984 | B1 | 12/2001 | Boss et al. |
| 6,331,874 | B1 | 12/2001 | de Garrido et al. |
| 6,332,045 | B1 | 12/2001 | Sawada et al. |
| 6,353,438 | B1 | 3/2002 | Van Hook et al. |
| 6,359,631 | B2 | 3/2002 | DeLeeuw |
| 6,369,855 | B1 * | 4/2002 | Chauvel et al. ........ 348/423.1 |
| 6,370,198 | B1 | 4/2002 | Washino |
| 6,466,226 | B1 | 10/2002 | Watson et al. |
| 6,496,183 | B1 | 12/2002 | Bar-Nahum |
| 6,509,930 | B1 | 1/2003 | Hirano et al. |
| 6,567,098 | B1 | 5/2003 | D'Amora |
| 6,573,905 | B1 | 6/2003 | MacInnis et al. |
| 6,587,129 | B1 | 7/2003 | Lavendel et al. |
| 6,611,269 | B1 | 8/2003 | Uehara et al. |
| 6,654,022 | B1 | 11/2003 | Egan |
| 6,690,427 | B2 | 2/2004 | Swan |
| 6,753,878 | B1 | 6/2004 | Heirich et al. |
| 6,788,312 | B1 | 9/2004 | Azar et al. |
| 6,806,982 | B2 | 10/2004 | Newswanger et al. |
| 6,831,999 | B2 | 12/2004 | Haikin |
| 6,833,837 | B2 | 12/2004 | Hei La |
| 6,859,235 | B2 | 2/2005 | Walters |
| 6,885,374 | B2 | 4/2005 | Doyle et al. |
| 6,928,196 | B1 | 8/2005 | Bradley et al. |
| 6,940,557 | B2 | 9/2005 | Handjojo et al. |
| 6,952,215 | B1 | 10/2005 | Devins et al. |
| 7,139,002 | B2 | 11/2006 | Estrop |
| 7,151,863 | B1 | 12/2006 | Bradley et al. |
| 7,158,668 | B2 | 1/2007 | Munsil et al. |
| 7,180,525 | B1 | 2/2007 | Naegle |
| 7,219,352 | B2 | 5/2007 | Estrop |
| 7,451,457 | B2 | 11/2008 | Estrop |
| 2002/0063801 | A1* | 5/2002 | Richardson ............ 348/589 |
| 2002/0145610 | A1* | 10/2002 | Barilovits et al. ........ 345/538 |
| 2002/0145611 | A1 | 10/2002 | Dye et al. |
| 2002/0154324 | A1 | 10/2002 | Tay et al. |
| 2003/0117638 | A1 | 6/2003 | Ferlitsch |
| 2003/0158979 | A1 | 8/2003 | Tateyama et al. |
| 2004/0032906 | A1 | 2/2004 | Lillig |
| 2004/0054689 | A1 | 3/2004 | Salmonsen et al. |
| 2005/0050554 | A1 | 3/2005 | Martyn |

FOREIGN PATENT DOCUMENTS

| | | |
|---|---|---|
| EP | 0651577 A2 | 5/1995 |
| EP | 1231775(A2) | 8/2002 |
| WO | WO9916242(A1) | 4/1999 |
| WO | WO 01/61992 | 8/2001 |
| WO | WO 02/067577 | 8/2002 |

OTHER PUBLICATIONS

Birn, "Digital Lighting and Rendering," 2001, available at <<http://www.3drender.com/glossary/fields.htm>>, 2 pages.

Marjanovic, "Croma Subsampling Standards," Mar. 31, 2003, available at <<http://www.mir.com/DMG/chroma.html>>, 3 pages.

"Gamma, Linear Color Space and HDR," available at <<http://softimage.wiki.avid.com/index.php/Gamma,_Linear_Color_Space_and_HDR>>, accessed on Jul. 21, 2006, 7 pages.

Programming in Java Advanced Imaging, Chapter 5, Sun Microsystems, Inc., 1999, available at <<http://java.sun.com/products/java-media/jai/forDevelopers/jai1_0_1guide-unc/Color.doc.html>>, accessed on Jul. 21, 2006, 12 pages.

"GPU: Changes Everything," NVidia, available at <http://www.nvidia.com/object/gpu.html>, 2 pages.

"Definitions of Parallel Processing on the Web," available at <http://www.google.com/search?hl=en&lr=&oi=defmore&q=define:parallel+processing>, 3 pages.

Mann, Stephen, "The Graphics Rendering Pipeline," 1997, available at <http://medialab.di.unipi.it/web/IUM/Waterloo/node7.html>, 2 pages.

"YUV," Wikipedia, available at <http://en.wikipedia.org/wiki/YUV>, 3 pages.

International Search Report and Written Opinion for PCT/US04/24707, 17 pages, mailing date Apr. 4, 2005.

Adrian Ford and Alan Roberts, "Colour Space Conversions," dated Aug. 11, 1998, available at <http://www.poynton.com/PDFs/coloureq.pdf>, accessed on Jul. 28, 2004, 31 pages.

Charles Poynton, "Frequently Asked Questions about Gamma," 1998, available at <http://www.poynton.com/PDFs/GammaFAQ.pdf>, accessed on Jul. 28, 2004, 12 pages.

Charles Poynton, "Frequently Asked Questions about Color," 1997, available at <http://www.poynton.com/PDFs/ColorFAQ.pdf>, accessed on Jul. 28, 2004, 24 pages.

Charles Poynton, *Digital Video and DHTV: Algorithms and Interfaces*, Morgan Kaufmann Publishers, 2003, table of contents, pp. xi to xxiii, and chapter 24, pp. 281-300.

Wolfgang F. Engel, Direct3D ShaderX: Vertex and Pixel Shader Tips and Tricks, Wordware Publishing, Inc., 2002, pp. 72-124.

Michael Blome, "Introducing Some New Video Mixing Renderer Sample Applications," dated Apr. 2003, available at <http://msdn.microsoft.com/library/default.asp?url=/library/en-us/dnwmt/html/introducingsomenewvideomixingrenderersampleapplica.asp>, accessed on Feb. 2, 2004, 20 pages.

Yahya H. Mirza and Henry da Costa, "DirectX 9.0: Introducing the New Managed3D Graphics API in the .NET Framework," from the Apr. 2003 issue of MSDN Magazine, available at <http://msdn.microsoft.com/library/default.asp?url=/msdnmag/issues/03/07/DirectX90/toc.asp>, accessed on Feb. 2, 2004, 10 pages.

Introductory page entitled "Deinterlacing and Frame-Rate Conversion," MSDN Library technical literature, available at <http://msdn.microsoft.com/library/default.asp?url=/library/en-us/graphics/dxvaguide_0t2f.asp>, accessed on Feb. 2, 2004, 1 page.

Search Report from Malaysian Application No. PI 20031681, which is related to the subject application, dated Jul. 13, 2007, one page.

Foreign Search Report for EP 03 00 5836, dated Dec. 15, 2004, 3 pages.

Foreign Search Report for EP 03 008706, dated Dec. 15, 2005, 3 pages.

U.S. Appl. No. 10/273,505, filed Oct. 18, 2002, entitled "Methods and Apparatuses for Facilitating Processing of Interlaced Video Images for Progressive Video Displays," Stephen Estrop, 73 pages.

U.S. Appl. No. 10/400,040, filed Mar. 25, 2003, entitled "Facilitating Interaction between Video Renderers and Graphics Device Drivers," Stephen Estrop, 85 pages.

U.S. Appl. No. 10/987,378, filed Nov. 12, 2004, entitled "Image Processing Using Linear Light Values and Other Image Processing Improvements," Munsil et al., 95 pages.

Mark G. Rawlins, "A Standards Solution to Your Graphics Problems," Graphic Software Systems, Inc., Frontiers in Computer Graphics, Proceedings of Computer Graphics Tokyo '84, copyright by Springer-Verlag Tokyo 1985, pp. 375-416.

U.S. Appl. No. 10/694,144, filed Oct. 27, 2003, entitled "Bandwidth-Efficient Processing of Video Images," Steven Estrop, 60 pages.

David Union, "Accessing Device Drivers from C#," Windows Developer Magazine, accessible at <www.wd-mag.com>, vol. 13, No. 4, Apr. 2002, pp. 19, 20, 22, 23, 26, 27.

Hui Xin-biao, Dong Yong-qiang, Qi Dan-qing, "Implementation of MPEG stream analyzer," Journal of China Institute of Communications, vol. 22, No. 10, Oct. 2001, pp. 57-62.

He Yong-yi, Xia Jun-sheng, Fang Ming-lun, "Development and Application of the NT Device Driver in CNC System," Journal of Shanghai University (English Edition), ISSN 1007-6471, vol. 5, No. 4 (Dec. 2001), pp. 317-321.

Patent Abstracts of Japan, Publication No. 2000311240, vol. 2000, No. 14, Publication date Nov. 7, 2000.

Patent Abstracts of Japan, Publication No. 2001084154, vol. 2000, No. 20, Publication date Mar. 30, 2001.

Don Musil and Stacey Spears, "The Chroma Upsampling Error and the 4:2:0 Interlaced Chroma Problem," Secrets of Home Theater and High Fidelity, DVD Benchmark, accessible at <<http://www.hometheaterhifi.com/volume_8_2/dvd-benchmark-special-report-chroma-bug-4-2001.html>>, Apr. 2001, Dec. 2002, Jan. 2003, 20 pages.

"YCbCr to RGB Considerations," Intersil Application Note, AN9717, Mar. 1997, available at <<http://www.intersil.com/data/an/an9717.pdf>>, 2 pages.

"Understanding Analog Video Signals," Dallas Maxim, Application Note 1184, available at <<http://www.maxim-ic.com/appnotes.cfm/appnote_number/1184>>, Sep. 4, 2002, 12 pages.

Introductory page entitled "An Introduction to QuickTimeTM," available at <<http://developer.apple.com/quicktime/qttutorial/overview.html>>, accessed on Jan. 13, 2005, 2 pages.

* cited by examiner

| Colorspace | Transfer function | |
|---|---|---|
| BT 709<br>SMPTE 170M | $V = -(1.099 * (-4*L)^{0.45} - 0.099)/4$<br>$V = 4.500\ L$<br>$V = 1.099\ L^{0.45} - 0.099$ | $-0.25 <= L < -0.0045$<br>$-0.0045 <= L < 0.018$<br>$0.018 <= L <= 1.33$ |
| SMPTE 240M | $V = 4.000\ L$<br>$V = 1.1115\ L^{0.45} - 0.01115$ | $0 <= L < 0.0228$<br>$0.0228 <= L <= 1$ |
| BT 470-2 Sys M | Gamma 2.2 | |
| BT 470-2 SysBG | Gamma 2.8 | |
| scRGB | Gamma 1.0 | |
| 8 bit sRGB | $L = V / 12.92$<br>$L = ((V+0.055)/1.055)^{2.4}$ | $0 <= V < .03928$<br>$0.03928 <= V <= 1$ |

Fig. 6

| Colorspace | Rx | Ry | Gx | Gy | Bx | By | White Pt | Wx | Wy |
|---|---|---|---|---|---|---|---|---|---|
| BT 709 (sRGB,scRGB) | .640 | .330 | .300 | .600 | .150 | .060 | D65 | .3127 | .3290 |
| BT 470-2 SysBG EBU 3213 | .64 | .33 | .29 | .60 | .15 | .06 | D65 | .313 | .329 |
| SMPTE 170M SMPTE RP 145 | .630 | .340 | .310 | .595 | .155 | .070 | D65 | .3127 | .3290 |
| SMPTE 240M | .630 | .340 | .310 | .595 | .155 | .070 | D65 | .3127 | .3291 |
| BT 470-2 Sys M (original NTSC) | .67 | .33 | .21 | .71 | .14 | .08 | SmpteC | .310 | .316 |
| SMPTE-C (NTSC '79) | .635 | .330 | .305 | .595 | .155 | .070 | SmpteC | .310 | .316 |

Fig. 7

| Colorspace | Transfer Matrix from Normalized R'G'B' to Y'Pb'Pr | | |
|---|---|---|---|
| BT 709 | .2126<br>-.114572<br>.500 | .7152<br>-.385428<br>-.454153 | .0722<br>.500<br>-.045847 | R'<br>G'<br>B' |
| BT 470-2 SysBG<br>SMPTE 170M<br>(BT Rec 601) | .299<br>-.169<br>.500 | .587<br>-.331<br>-.419 | .114<br>0.500<br>-0.081 | R'<br>G'<br>B' |
| SMPTE 240M | .212<br>-.116<br>.500 | .701<br>-.384<br>-.445 | .087<br>.500<br>-.055 | R'<br>G'<br>B' |

Fig. 8

| Colorspace | Transfer Matrix from Y'Pb'Pr' to Normalized R'G'B'BT |
|---|---|
| 470-2 SysBG SMPTE 170M (BT Rec 601) | 1.  -0.000001  1.402000   Y'<br>1.  -0.344136  -0.714136  Pb'<br>1.  1.772000   0.000000   Pr' |
| BT 709 | 1  0.000000   1.574800   Y'<br>1  -0.187324  -0.468124  Pb'<br>1  1.855600   0.000000   Pr' |

Fig. 9

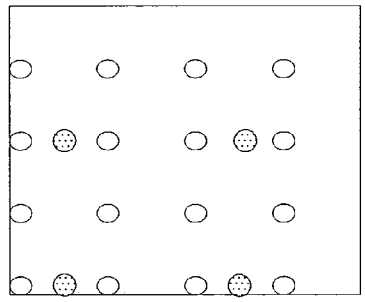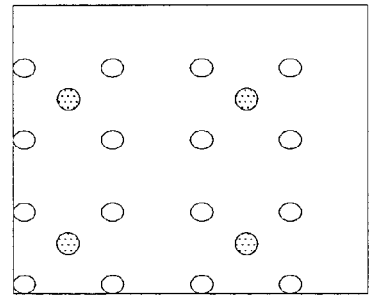
Fig. 11

STRATEGIES FOR PROCESSING IMAGE INFORMATION USING A COLOR INFORMATION DATA STRUCTURE

This application claims priority to U.S. Provisional Application Ser. No. 60/492,029, filed on Aug. 1, 2003, entitled "Bandwidth-Efficient Processing of Video Images," naming Stephen J. Estrop as sole inventor. The 60/492,029 Provisional Application is incorporated by reference herein in its entirety.

This application is also a continuation-in-part of U.S. Non-Provisional application Ser. No. 10/694,144, filed on Oct. 27, 2003, now U.S. Pat. No. 7,139,002, also entitled "Bandwidth-Efficient Processing of Video Images," naming Stephen J. Estrop as sole inventor. The Ser. No. 10/694,144 Non-Provisional application is incorporated by reference herein in its entirety.

Finally, this application is related to U.S. Non-Provisional application Ser. No. 10/273,505, filed on Oct. 18, 2002, now U.S. Pat. No. 7,219,352, entitled "Methods and Apparatuses for Facilitating Processing of Interlaced Images for Progressive Video Displays," naming Stephen J. Estrop as the sole inventor. The Ser. No. 10/273,505 Non-Provisional application is incorporated by reference herein in its entirety.

TECHNICAL FIELD

This subject matter pertains to strategies for processing image information, and, in a more particular implementation, to strategies for processing image information using improved techniques for ensuring that the color content of the image information is reproduced correctly.

BACKGROUND

Human vision relies on rod photoreceptor cells that respond to very low levels of light and cone photoreceptor cells that respond to color. The cone cells generally respond to three portions of the visible electromagnetic spectrum, namely long wavelength (e.g., generally corresponding to red), medium wavelength (e.g., generally corresponding to green), and short wavelength (e.g., generally corresponding to blue). As such, all colors can be expressed as different combinations of at least three different color components. Generally, color itself is a complex phenomenon that ensues from both the physical aspects of electromagnetic radiation in the visible portion of the spectrum as well as the vision-related and cerebral "mechanisms" used to process such information. For instance, human vision is more responsive to the intensity of light than to the color (chroma) components of light.

Electronic apparatuses that reproduce color images complement the trichromatic nature of human vision by providing three types of light sources. The three types of light sources produce different spectral responses that are perceived as different colors to a human observer. For instance, a cathode ray tube (CRT) provides red, green and blue phosphors to create different colors. Other technologies do not use phosphors, but otherwise reproduce color using light sources that emit at least three kinds of light.

The Commission Internationale de L'Éclairage (CIE) has set forth a comprehensive system that maps the spectral features of light to different perceived colors. In connection therewith, the term "matching function" refers to statistically tabulated response curves (usually to short, medium and long wavelengths) of an "average" viewer to a set of reference lamps at each wavelength. For red, green, and blue, these functions are represented as r(w), g(w) and b(w), respectively, where "w" denotes wavelength. Such reference lamps—or color primaries—define the light sources (typically monitor phosphors) used by an apparatus to reproduce image information having color content. The term "color space" refers to a specification defined by a set of color primaries and matching functions.

An abstract color specification can mathematically map tuples of chromaticities into different colors in the manner described above. However, a number of specific coding systems have been developed to ensure a more efficient coding scheme that can be applied to real-world applications, such as the transmission and presentation of color image information. The real-world application that first confronted the industry was the broadcast and presentation of analog television signals. More recent applications involve the transmission and presentation of digital video information over networks, such as TCP/IP networks (e.g., the Internet). Further, the industry now accommodates the transmission and presentation of high definition (HD) video information in addition to standard definition (SD) video information. The features of a coding system can thus often be traced back to certain problems confronted by the industry at certain times.

Whatever their approach, coding systems address a common set of issues that arise in the reproduction of image information having color content. The following discussion provides an overview of common issues that coding systems are likely to address in one form or another. (As to terminology, the term "image information" is used in this disclosure to represent any information that can be displayed to a user; this term is used broadly to encompass both still image information and moving video information.)

Color Space and Related Considerations

Colors can be specified using three components. An image stream that relies on the transmission of color content using discrete color components is referred to as component video. One common coding approach specifies color using red, green and blue (RGB) components. More formally, the RGB components describe the proportional intensities of the reference lamps that create a perceptually equivalent color to a given spectrum. For example, the R component can be defined by:

$$R = \int_{300nm}^{700nm} L(w)r(w)dw,$$

where L(w) correspond to a given spectrum and r(w) corresponds to a matching function r(w) for the color space. In general, an RGB color space can be specified by the chromatic values associated with its color primaries and its white point. The white point refers to the chromaticity associated with a reference white color.

Computer monitors generally use the RGB model to present color content to users. However, the RGB coding model may be an inefficient choice for the transmission of image information. Accordingly, image information is commonly transmitted to a target apparatus using some coding model other than RGB. Upon receipt, the image information can be transformed into the RGB color space for display, e.g., using a 3×3 affine transformation. As will be described below under the heading "Gamma Considerations," each R, G, or B component data can also be expressed in terms of its pre-gamma corrected form, referred to as R', G' and B' values. (Generally, as per convention, the prime denotes nonlinear information in this disclosure.)

A common tactic in this regard is to define color by reference to a luminance-related component (Y) and chroma-related components. Luminance general refers to the perceived intensity (brightness) of light. Luminance can be expressed in a pre-gamma-corrected form (in the manner described below under "Gamma Considerations") to yield its nonlinear counterpart, referred to as "luma" (Y'). The chroma components define the color content of the image information relative to the luma. For example, in the digital domain, the symbol "Cb" corresponds to an n bit integer scaled representation of the difference B'−Y' (typically from the range of −127 . . . 128 in 8 bit values), and the symbol "Cr" corresponds to an n bit integer scaled representation of the difference R'−Y'. The symbol "Pb" refers to the analog counterpart of Cb, and the symbol "Pr" refers to the analog counterpart of Cr. The symbols 'Pb' and 'Pr' can also refer to the digital normalized form of Cb or Cr with a nominal range of [−0.5 . . . 0.5]. The component image information defined by CbCr and PbPr may be formally primed (e.g., Cb'Cr' and Pb'Pr') when they represent nonlinear information.

Color content can also be communicated as composite video (rather than the above-described component video). Composite signals combine luma and chroma information in one signal. For instance, in the coding system Y'UV, U represents a scaled version of B−Y and V represents a scaled version of R−Y. These luma and chroma components are then processed to provide a single signal (e.g., in the manner set forth in the National Television System Committee (NTSC) format or Phase Alternate Line (PAL) format). The coding system Y'IQ defines another composite coding system formed by transforming the U and V components in a prescribed manner. Generally, the industry has historically promoted the use of Y-related color spaces (Y'CbCr, Y'PbPr, YUV, YIQ, etc.) because reducing color image information in these color spaces can be performed more easily compared to image information expressed in the RGB color space.

It is generally possible to transform color content from one color space to another color space using one or more matrix affine transformations. More formally, the property of metamerism makes it possible to express one set of color space coefficients in terms of another set of matching functions (where "metamers" refer to two spectra which map to the same set of color space coefficients, and hence appear to be perceptually identical—that is, that look like the same color).

Gamma Considerations

Cathode ray tubes (CRTs) do not have a linear response transfer function. In other words, the relationship of voltage applied to a CRT and the resultant luminance produced by the CRT does not define a linear function. More specifically, the predicted theoretical response of a CRT has a response proportional to the 5/2 power law; that is, for a given input voltage "V," the CRT's resultant luminance "L" can be computed as $L=V^{2.5}$.

In application, the source of image information (such as a video camera) commonly pre-compensates the image information by applying a transfer function to the image information. The "transfer function" is approximately the inverse function of the CRT luminance response. This transfer function applied at the source—commonly referred to as the encoding transfer function—produces "gamma corrected" nonlinear image information. When the nonlinear signal is passed through the display device, a linear luminance is produced. According to the notation described above, the nonlinear (or precompensated) image information is denoted by priming its components, e.g., Y'Cb'Cr'.

It is common to transmit image information in nonlinear (compensated) form. The presentation device (e.g., CRT) of the receiving apparatus can, due to its inherent nonlinearity, complement the encoding transfer function to provide appropriately transformed color content for consumption.

It is common to adjust the exponent of the encoding transfer function to account for the condition in which the image information is likely to be viewed. For instance, video information displayed on conventional televisions is typically presented in a dim viewing environment common in a home setting, while image information displayed on conventional computer monitors is typically presented in a bright viewing environment common to an office setting. Different transfer function adjustments are appropriate to these different viewing environments. For this reason, television video sources typically use a transfer function that is based on the built-in assumption that the image information will be presented in a dim viewing condition. This means that the transfer function applied by the source will commonly under-compensate for the inherent nonlinearity of the CRT.

As another special consideration, encoding of image information using a transfer function commonly applies a special approximation function for the low voltage portion of the function. Namely, encoding techniques commonly provide a linear segment in this portion to reduce the effects of noise in the imaging sensor. This segment is referred to as a "linear tail," having a defined "toe slope."

Sampling and Alignment of Chroma Information Relative to Luma Information

As noted above, human vision is more responsive to light intensity than the chromatic components of light. Coding systems take advantage of this fact to reduce the amount of chroma (Cb'Cr') information that is coded relative to the amount of luma information (Y'). This technique is referred to as chroma sub-sampling. A numeric notion represented generically as L:M:N can be used to express this sampling strategy, where "L" represents the sampling reference factor of the luma component (Y'), and "M" and "N" refer to the chroma sampling (e.g., Cb and Cr, respectively) relative to the luma sampling (Y'). For instance the notation 4:4:4 can denote Y'CbCr data in which there is one chroma sample for every luma sample. The notation 4:2:2 can denote Y'CbCr data in which there is one chroma sample for every two luma samples (horizontally). The notation 4:2:0 can denote Y'CbCr data in which there is one chroma sample for every two-by-two cluster of luma samples. The notation 4:1:1 can denote Y'CbCr data in which there is one chroma sample for every four luma samples (horizontally).

In those circumstances where the coding strategy provides more luma information than chroma information, a decoder can reconstruct the "missing" chroma information by performing interpolation based on the chroma information that is supplied. More generally, downsampling refers to any technique that produces fewer image samples in comparison with an initial set of image samples. Upsampling refers to any technique that produces more image samples in comparison with the initial set of image samples. Thus, the above-described interpolation defines a type of upsampling.

Coding strategies also specify the manner in which chroma samples are spatially "aligned" to the corresponding luma samples. Coding strategies differ in this regard. Some align the chroma samples with the luma samples, such that the chroma samples are directly positioned "over" the luma samples. This is referred to as cositing. Other strategies position chroma samples in interstitial spaces within the two-dimensional array of luma samples. FIGS. 10-12 (to be discussed below in turn) show different sampling and alignment strategies for presenting luma and chroma information.

Quantization Considerations

Quantization refers to the methodology whereby discrete numeric values are assigned to the signal amplitudes of color components. In the digital domain, the numeric values span a prescribed range (gamut) of color space values in a prescribed number of steps. It is common, for instance, to use 255 steps for describing each component value, such that each component can assume a value from 0 to 255. It is common to express each color value using 8 bits, although color can also be expressed with higher precision (e.g., 10 bits, etc.), as well as with lower precision.

Coding strategies often allocate portions on both ends of the range of quantization levels for representing back levels and white levels, respectively. That is, a coding strategy will often define a reference black level and a reference white level, but also allocate coding levels beyond these reference levels for expressing values that swing beyond reference black and white levels. For example, an 8-bit coding strategy may assign the level 16 to black and the level 235 to white. The remaining levels that are lower than 16 define so-called "toe room," while the remaining levels over 235 define so-called "head room."

Interlaced vs. Progressive Representation Considerations

Conventional television signals are scanned in interlaced fashion. In interlacing, a first field of a video frame is captured, followed, shortly thereafter, by a second field of the video frame (e.g., 1/50 or 1/60 seconds thereafter). The second field is vertically offset relative to the first field by a slight amount, such that the second field captures information in the interstitial spaces between scanning lines of the first field. So-called bob interlacing is one known type of interleaving strategy. The complete video frame is composed by presenting the first and second fields in quick succession so that they are perceived by a human viewer as a single frame of information.

However, computer monitors and other presentation equipment display image information in progressive, not interleaved, fashion. Thus, in order for an apparatus to present interlaced information on a computer monitor, it must display progressive frames at the interlaced field rate by interpolating the data for the opposite field (a process referred to as "deinterlacing"). For example, to display an interlaced field, it must interpolate the "missing" data for the spatial location between the lines by examining the fields on either side. The non-interlaced image format is referred to as the "progressive" format.

Additional information regarding each of the above topics may be found in a number of introductory texts, such as Charles Poyton's well-regarded *Digital Video and HDTV*.

Compounding the above-described complexity, the industry accommodates a large number of different formal standards for representing image information. Standards have been promulgated by a number of organizations and committees, including the International Telecommunications Union (ITU), the European Broadcasting Union (EBU) (which also promotes Digital Video Broadcasting, or DVB), the Audio Engineering Society (AES), the Advanced Television Systems Committee, Inc. (ATSC), the Society of Motion Picture and Television Engineers (SMPTE), Sequential couleur avec mÈmoire (SECAM), National Television System Committee (NTSC), and so forth.

Each of these organizations has carved out particular combinations of coding features from the above-described universe of possible coding options. As such, as appreciated by the present inventors, standards generally differ as to their definition and application of: color primaries; transfer functions; intended viewing conditions; transfer matrices; toe room and head room specifications; chroma subsampling and alignment strategies, and so forth. The color primaries (together with the white point reference) define the basic color space of a standard. The transfer function determines how the standard converts between linear image information and non-linear information. The intended viewing conditions define the assumptions that the standard makes about the viewing environment in which the image information is likely to be consumed (such as the assumption that television will be viewed in a dimly lit home setting). The viewing conditions change the effective gamma and brightness (the black level) and contrast (the white level) of the image information. The transfer matrices determine how the standard converts between different color spaces (e.g., from Y'YbYr to RGB color spaces). The head room and toe room specifications determine the quantization levels that the standard allocates to represent ranges of black and white colors. The chroma sub-sampling and alignment strategies specify the manner in which the chroma information is sub-sampled and positioned relative to the luma information.

Existing standards-related documentation sets forth the requirements of each standard in exacting detail. Representative standards include:

ITU-R Recommendation BT.470 is an international standard that provides specifications for analog and monochrome televisions apparatus.

ITU-R Recommendation BT.601 is an international standard that defines studio digital coding of image information. This standard uses a Y'CbCr coding of image information.

ITU-R Recommendation BT.709 is an international standard that defines studio coding of high definition video information. High definition (HD) content represents video content that is higher than standard definition (SD), typically 1920×1080, 1280×720, and so forth.

SMPTE 170M is a standard that defines coding of composite analog video information (e.g., NTSC).

SMPTE 240M is a standard that defines coding of analog high definition video information.

IEC 61966-2-1 (sRGB) is a standard for coding image information into 255 levels using an 8-bit quantization scheme.

IEC 61966-2-2 (scRGB) is a standard which defines a linear form of sRGB and significantly expands the color gamut of sRGB.

ISO/IEC 13818 (MPEG-2) is a standard for coding audio and video signals in compressed form.

ISO 10918-1 (JPEG) is a standard for lossy compressing still image information.

The great variety of coding standards in use today contributes to a number of difficulties in the coding, transmission and processing of image information. By way of overview, video processing pipelines associated with specific apparatuses are often designed to process a particular type of signal having defined formatting; in this limited role, these apparatuses may correctly process such image information in a reliable manner. However, in the context of the wider universe of image information in use today, these apparatuses may lack mechanisms for interpreting the color formatting of other kinds of image information, and for reliably propagating this formatting information through the pipeline. More precisely, the video pipeline may receive information defining certain aspects of the color formatting applied to the received image information, but, as appreciated by the present inventors, the video pipeline may lack suitable mechanisms for reliably propagating this color information down the pipeline to downstream components in the pipeline. As a result, such formatting information is "lost" or "dropped." Downstream components can address the paucity of information pertaining to the color formatting by "guessing" at the formatting information. When the components guess incorrectly, the pipeline produces image information in a suboptimal or even incorrect manner.

FIG. 1 is presented as a vehicle for further explaining the above potential problem. FIG. 1 shows a high level representation of a video processing pipeline 100. The pipeline 100 includes conventional processing stages defined by an input stage 102, a processing stage 104 and an output stage 106. As to the input stage 102, input source 108 represents any source of image information. The source 108 can generally comprise newly captured image information (e.g., created by a camera or scanner), or previously captured image information that is presented to the input stage 102 via some channel (e.g., received from a disc, over an IP network, etc.). In the former case, capture processing functionality 110 can perform any kind of preliminary processing on the image information received from the source 108. In the latter case, the decoder functionality 112 performs any kind of stream-based information extraction and decompression to produce image data. Generally, such processing can include separating image information from audio information in the received information, uncompressing the information, and so forth. As to the processing stage 104, processing functionality 114 performs any kind of processing on the resulting image information, such as mixing multiple streams of image information together into a composite signal. As to the output stage, output processing functionality 116 represents any kind of processing performed on the processed image information in preparation for its output to an output device 118. Output device 118 may represent a television, a computer monitor, and so forth. Output devices may also represent storage devices. Further, an output "device" (or output functionality 116) can provide compression and formatting functionality (such as multiplexers) that prepare the information for storage on a device, or for distribution over a network.

The bottom row of blocks in FIG. 1 summarizes the above-described deficiencies in known systems. Block 120 indicates that the pipeline functionality (110, 112, 114, 116) fails to accurately interpret the color formatting applied to input signals and/or fails to reliably propagate color information down the pipeline to downstream components. For instance, the pipeline 100 may receive image information that has been coded using a prescribed format. The received information may include certain fields that identify features of the formatting that was used, or these features can be deduced based on other telltale properties of the received information. However, because of the plethora of standards in use, the initial stages of the pipeline 100 lack functionality for properly interpreting this information and passing it to downstream components in the video pipeline 100. As a result, this coding information becomes immediately lost. This can result in the situation in which image information is passed to downstream pipeline components with no guidelines on how the components should interpret this image information; it is essentially just 1's and 0's.

Block 122 represents the manner in which the video pipeline 100 deals with the above difficulty. Namely, the functional components that lack guidelines on how to interpret the color content in the image information often make "guesses" as to how to interpret it. Some guesses are accurate but others are not. To name but a few examples, the video pipeline may make inaccurate assumptions regarding the transfer function that has been applied to the image information (perhaps based on image size), the lighting conditions assumptions inherent in the image information, the chroma sub-sampling scheme used by the image information (based on the data format), and so forth.

Block 124 represents the potential consequences of incorrect guesses. Namely, incorrect guesses can result in suboptimal or incorrect display quality. An image presentation may appear as having "unnatural" colors or having motion artifacts. Or it may appear as unduly "contrasty," distorted, inappropriately cropped, and so forth There is accordingly a need for a more satisfactory technique for processing image information having color content.

SUMMARY

According to one exemplary implementation, a method is described for processing image information having color content expressed in a prescribed format. The method includes: (a) providing a color information data structure that contains color information that defines at least one aspect of the prescribed format; (b) passing the color information data structure to at least one functional component used to process the image information, along with the image information; and (c) processing the image information at the above-mentioned at least one functional component based on the color information in the color information data structure.

According to another exemplary feature, the color information data structure comprises: (a) a video transfer function field which conveys information regarding the transfer function used to convert linear image information into nonlinear image information, and/or vice versa; (b) a color primaries field which conveys color primaries associated with the image information; (c) an image light field which conveys an intended viewing condition associated with the image information; (d) a transfer matrix field that can be used to modify the color space of the image information; (e) a nominal range field which conveys information regarding potential toe room and head room associated with the image information; and (f) a video chroma sampling field which indicates the manner in which chroma samples in the image information are sampled and aligned relative to associated luma samples.

According to another exemplary feature, the above-mentioned at least one functional component belongs to a group of functional components defining a video processing pipeline, wherein the color information data structure is passed down the video processing pipeline for use by downstream functional components.

According to another exemplary feature, the above-mentioned at least one functional component further determines at least one other aspect of the prescribed format and adds the at least one other aspect to at least one unknown field in the color information data structure.

According to another exemplary feature, the above-mentioned passing of the color information data structure comprises passing the color information data structure using an unused field of an existing data structure.

According to another exemplary feature, the method further comprises setting a flag which indicates that the above-mentioned at least one functional component has the capacity to process the color information data structure.

Another exemplary method is described for processing image information, comprising: (a) providing a principal video stream of image information; (b) providing a video sub-stream of image information; and (c) performing, based on color information specified in a color information data structure, at least two tasks involving the principal video stream and the video sub-stream to produce output video information expressed in a specified color space.

Another exemplary method is described for processing image information, comprising: (a) converting input image information in a luma-related color space into linear image information within an RGB-related color space; (b) performing processing on the linear image information in the RGB-related color space to produce processed information; and (c) converting the processed information into nonlinear image information within a luma-related color space.

According to another exemplary feature of the above-mentioned method, the converting also involves transforming the input image information from an interlaced format into a progressive format prior to the processing operation, and, after processing, transforming the processed information from the progressive format into an interlaced format.

Additional exemplary implementations are described in the following.

BRIEF DESCRIPTION OF THE DRAWINGS

FIGS. 6-12 show various exemplary formatting information that the data structure of FIG. 5 can reference.

Finally.

Figure 1:
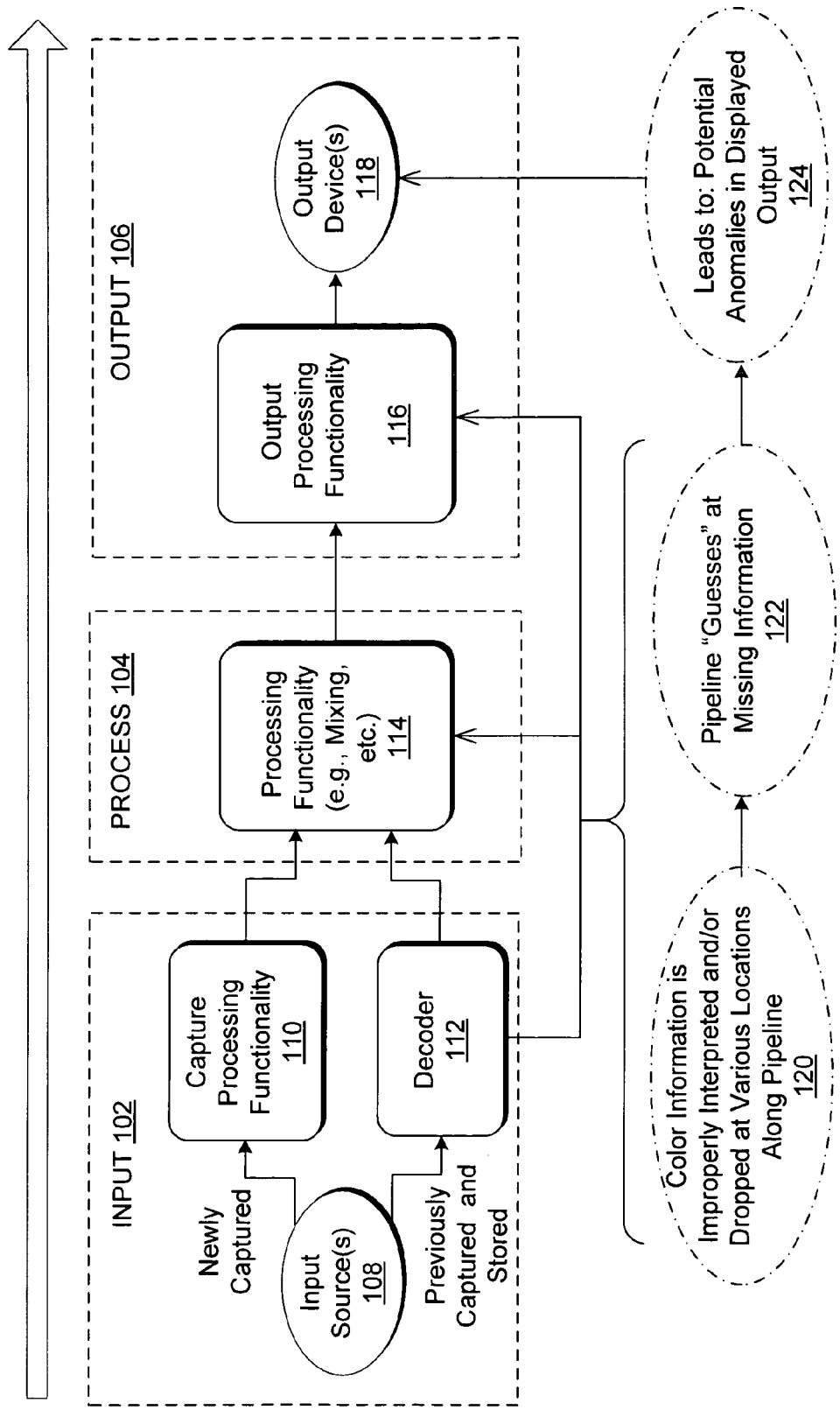
FIG. 1 shows an exemplary video pipeline and its associated problems.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

The following describes exemplary mechanisms and procedures for improving the handling of image information having color content. By way of broad overview, the mechanisms and procedures provide a data structure that captures information regarding the color formatting that has been applied to the image information. This information is referred to as "color information," while the data structure itself is referred to as the "color information (CI) data structure." In one exemplary case, the color information may specifically include fields which convey the following information associated with the image information: transfer function information; color primary information; video lighting information; transfer matrix information; nominal range information; and chroma sub-sampling information. This grouping of fields is intended to be illustrative rather than limiting. Other implementations can include additional fields, can omit certain fields identified above, and so forth.

The video processing pipeline uses the color information as an aid to facilitate the processing of image information. For instance, the color information can specify the manner in which a functional component within the pipeline should transform the image information. Moreover, in marked contrast to known systems, the video pipeline includes functionality for passing the CI data structure down the pipeline so that downstream components in the pipeline can draw information from the CI data structure. This provision thereby reduces the chances that a video pipeline will make inaccurate guesses regarding the nature of the image information; consequently, this provision has the potential of improving the quality of displayed images.

According to another exemplary feature, components within the pipeline can include functionality for independently interpreting the image information. In those instances where a component can reliably determine a previously unspecified color-related aspect of the color formatting, the component can add this information to the CI data structure. This supplemental color information then becomes available to downstream components in the video pipeline, which, in turn, can also supplement the CI data structure by adding new information. Thus, the color information data structure can become more "informative" as it passes through the pipeline and collects information from components within the pipeline that are able to deduce different properties of the formatting applied to the image information.

According to another exemplary feature, the color information is intended to provide a "receptacle" to convey information regarding a great number of possible formats that can be used to code image information. Accordingly, the CI data structure can be viewed as a kind of universal interface, allowing the video pipeline to accept any kind of image information and process it correctly by interpreting the color information conveyed by the CI data structure.

According to another exemplary feature, the CI data structure uses a particularly efficient scheme to pack a great variety of information regarding different format standards in a few bits of information. In one exemplary case, the data structure packs a great variety of color information in a few words (e.g., in a 16-bit structure, 24-bit structure, etc.).

According to another exemplary feature, a system can convey the CI data structure by employing unused fields provided in one or more existing data structures used in the video pipeline. This allows systems that use such existing data structures to exploit the color information without expensive and complex re-tooling of the systems. Further, if these systems have not been configured to process the CI data structure, but it is nonetheless present in input information fed to such systems, these systems can safely ignore the CI data structure without "breaking" the systems.

According to another exemplary feature, interlaced image information in a luma-related color space (e.g., Y'Cb'Cr') can be converted into a linear and progressive RGB color space. Various processing (such as rescaling, etc.) can then be performed on the image information within the linear/progressive RGB color space. The image information can then be converted back to a luma-related color space (e.g., Y'Pb'Pr') for output (e.g., for display on a television). The processing of luma-related information 104 in the linear/progressive RGB space departs from other approaches, which do not convert image information 104 into an interim linear RGB color space for processing in the above-summarized manner.

Still other features and attendant benefits are described in detail in the following detailed specification.

As to terminology, the term "image information" is intended to encompass any kind of information that can be consumed by a user in any visual form. The image information can represent information expressed in any format, such as analog format, digital format, or a combination of digital and analog formats. The image information can represent still image information (e.g., digital photographs) and/or moving information (e.g., video information). Still further variations are contemplated by the use of the term image information.

The term "color information" represents any information which describes the color content of the image information. For instance, where the image information expresses color content in a prescribed format, the color information can convey information pertaining to that format. The term "color information data structure (CI data structure)" refers to the manner in which the color information can be coded and conveyed within the video pipeline.

The term "video pipeline" refers to any functionality for processing image information. A pipeline includes at least two functional components that operate on image information in series fashion, that is, one after the other.

This disclosure includes the following sections. Section A describes an overview of an exemplary color information data structure and its manner of use within a video pipeline. Section B describes exemplary conversion operations that can be performed within the video pipeline of Section A. Section C describes an exemplary composition of the color information data structure defined in Section A. Section D describes one specific exemplary implementation of a video pipeline that embodies the principles set forth in Sections A-C. And Section E describes an exemplary computer environment for implementing aspects of the features described in Sections A-D.

Generally, as to the structural aspects of this subject matter, any of the functions described herein can be implemented using software, firmware (e.g., fixed logic circuitry), manual processing, or a combination of these implementations. The terms "module," "functionality," and "logic" as used herein generally represents software, firmware, or a combination of software and firmware. In the case of a software implementation, the term module, functionality, or logic represents program code that performs specified tasks when executed on a processing device or devices (e.g., CPU or CPUs). The program code can be stored in one or more fixed and/or removable computer readable memory devices.

As to the procedural aspects of this subject matter, certain operations are described as constituting distinct steps performed in a certain order. Such implementations are exemplary and non-limiting. Certain steps described herein can be grouped together and performed in a single operation, and certain steps can be performed in an order that differs from the order employed in the examples set forth in this disclosure.

Figure 2:
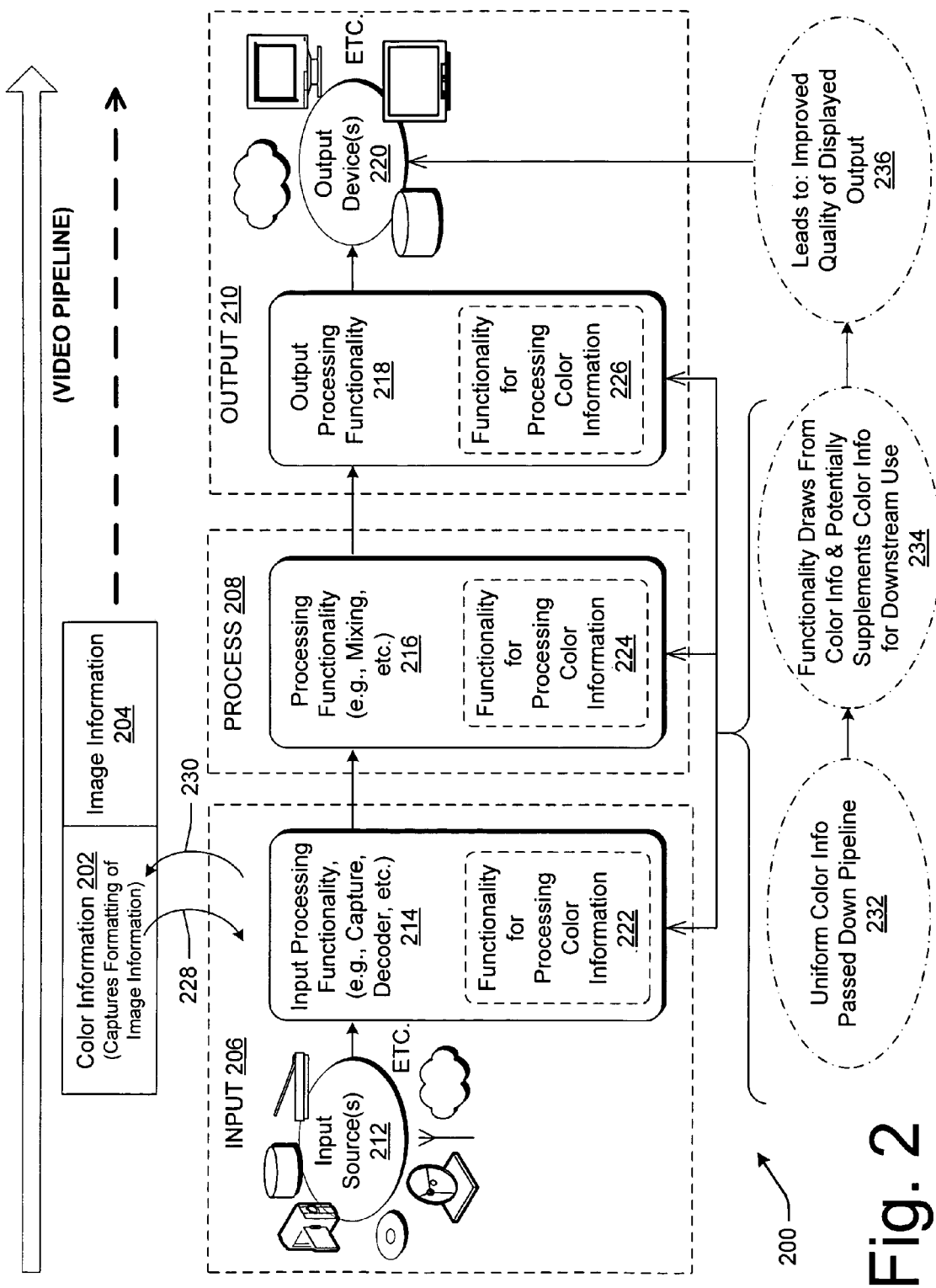
FIG. 2 shows an improved exemplary video pipeline having functionality for processing a data structure that provides color information.

A. Overview of an Exemplary Color Information (CI) Data Structure and Its Application FIG. 2 shows an exemplary overview of a video processing pipeline 200 that employs a color information (CI) data structure 202. The CI data structure 202 contains information which describes the formatting used to express color within image information 204 and/or which describes how the image information 204 is to be subsequently processed by the pipeline 200. The CI data structure 202 provides a uniform "receptacle" to receive color information regarding a great number of different color coding formats. The CI data structure 202 thereby defines a kind of universal interface, expanding the types of image information that the pipeline 200 can successfully process in an anomaly-free manner. According to another advantageous feature, all functional components in the video pipeline can draw from the CI data structure 202 and potentially supplement it with new information pertaining to the image information 204 that these components are able to deduce.

The video pipeline 200 itself includes a series of processing stages, including an input stage 206, a processing stage 208, and an output stage 210. As to the input stage 206, input source 212 represents any source of image information 204. The source 212 can generally comprise newly captured image information (e.g., created by a camera or scanner), or previously captured image information that is presented to the input stage 206 via some route, e.g., received via broadcast transmission (e.g., satellite or cable transmission, etc.), received via any kind of network (such as a TCP/IP digital network, e.g., the Internet), received via a local storage of image information (such as a video disc, local database, etc.), and so forth. Input processing functionality 214 is configured to perform any kind of preliminary processing on the image information 204, which can differ depending on the nature of the input source 212 (e.g., depending on whether the image information 204 is newly captured or input from some source of pre-captured information. In the case of inputting previously captured/stored information, processing can include separating image information from audio information in a received signal, uncompressing the image information, and so forth. As to the processing stage 208, processing functionality 216 is configured to perform any kind of processing on the captured image information 204, such as mixing multiple streams of video information together into a composite signal, performing color space conversions on the captured image information 204, and so forth. As to the output stage 210, output processing functionality 218 is configured to perform any processing of the image information 204 in preparation for its output to an output device 220. Output device may represent a television, a computer monitor, a storage device (both remote and local), any network-accessible target location, and so forth. Each of the functional components (214, 216, 218) can be physically implemented as a single apparatus for performing ascribed tasks, or multiple apparatuses coupled together in series or parallel fashion. In one case, the components in the pipeline 200 can correspond to dynamically configured logic modules (e.g., software modules).

Each of the functional components (214, 216, 218) includes respective functionality (222, 224 226) configured to process the CI data structure 202. This functionality (222, 224, 226) can include logic for reading the information in the CI data structure 202, for interpreting information in the CI data structure 202, and for applying the interpreted information in the CI data structure 202 to the processing of the image information 204. The functionality (222, 224, 226) can also include logic for deducing additional features pertaining to the color formatting used in the image information 204, and for supplying this deduced information to the CI data structure 202 to fill in a previously unknown field in the CI data structure 202. For instance, the functionality (222, 224, 226) may determine that a certain format is being used. Based on this, it can deduce (for example, by accessing a predetermined lookup table) that the standard has certain coding characteristics. The functionality (222, 224, 226) can then supply information regarding these deduced characteristics to fill in previously unknown fields of the CI data structure 202. More specifically, in one implementation, components in the pipeline 200 can automatically set unknown values in the CI data structure 202 to a prescribed value, such as 0. This act constitutes initializing the CI data structure. Subsequent component are alerted to the unknown nature of certain values in the CI data structure by virtue of these values having been set to 0. These components then remain free to supply the missing values if they are able to do so. Arrow 228 generally denotes that the functionality (222, 224, 226) can pull information from the CI data structure 202. Arrow 230 generally denotes that the functionality (222, 224, 226) can add to the CI data structure 202. FIG. 2 specifically shows that functional component 214 is interacting with the CI data structure 202. But as mentioned above, this same CI data structure 202 is passed down through the video pipeline 200, so that any of the other functional components (214, 216, 218) can interact with the CI data structure 202 in the manner indicated.

Different functional component (214, 216, 218) can handle the CI data structure 202 differently depending on a number of factors, such as the processing stage (206, 208, 210) involved, the specifics of a particular application, the color format being processed, and so forth.

For instance, the functionality 222, associated with the sources 212 and input processing functionality 214, can perform an instrumental role in determining information pertaining to the formatting standards used in the received image information 104, and for supplying such information to the CI data structure 202 for use by downstream components of the pipeline 200. As a general rule, in the case of new capture, the capture device will typically implicitly "know" the formatting applied to image information it is producing. On the other hand, a device receiving image information created by some other source may be able to determine the color formatting applied to the image information by investigating any format-related information associated with the received image information, or by making logical and reliable guesses. Specific examples follow. For instance, analog capture devices commonly know the video standard and color space that they are capturing data relative to. As another example, a DVD navigator knows the color spaces of the image information 204 that it is handling by virtue of the fact that it is parsing a DVD with NTSC content. As another example, any capture device receiving an MPEG-2 elementary video stream can deduce certain properties of the formatting being used, as MPEG-2 explicitly lists the color information in its sequence display extension header; for instance, the header indicates the primaries, transfer function, and transfer matrix associated with the image information 204. As another example, a high definition (HD) digital tuner should know that it is streaming HD data within a 709 color space, and so forth. In all of these cases, the functionality 222 can supply information that it "already knows" about the color formatting being employed to the CI data structure 202 for use by downstream functional components in the pipeline 200. In known systems, this information was immediately dropped, and therefore lost.

Color space converters in the pipeline 200 can use the CI data structure 202 to ensure that accurate conversion operations are performed on the received image information 204. In other words, for instance, the color space converters can use information gleaned from the CI data structure 202 to determine the conversion algorithms that they apply, or to determine the settings/parameters used in the algorithms, and so forth.

Mixers in the pipeline 200 serve the purpose of mixing together different types of image information, where such information is potentially expressed using different color formats. For example, one application might seek to combine digital photographs with superimposed graphical information, etc. The pipeline 200 can use the enhanced formatting information provided in the CI data structure 202 to ensure that all of the information being combined has a common format (e.g., a common color space). This operation can be performed prior to the information being receiving by the mixers, e.g., by upstream components (relative to the mixers in the pipeline).

Or this operation can be allocated to the graphical processing hardware. The graphical processing hardware may comprise one or more graphic processing units (GPUs), e.g., as provided by a video processing card (as will be discussed below with reference to FIG. 13). In this case, the CI data structures 202 associated with the information to be combined can be passed down the pipeline to the graphical processing hardware, which can then use the CI data structures 202 to convert the image information to a common format, whereupon the information can then be combined. In this implementation, by virtue of the supplemental color information provided by the CI data structures 202, drivers in the video pipeline no longer need to guess at which color space or chroma scheme was intended, thus reducing the potential that the drivers (or graphics processing hardware) will guess incorrectly and produce poor output results.

In summary, the bottom row of blocks in FIG. 2 summarizes exemplary merits of the use of the CI data structure 202 as applied to the video pipeline 200. Block 232 indicates that the CI data structure 202 has a uniform structure that is passed down through the pipeline 200. Block 234 indicates that each functional component (214, 216, 218) in the pipeline 200 can draw information from the CI data structure 202, as well as supply values for unknown fields in the CI data structure 202. This means that, compared to known systems, the functional components (214, 216, 218) can reduce or eliminate the amount of unjustified guessing that they need to perform to process the image information 204. Block 236 indicates that the end result of this strategy may result in improved quality of color reproduction. That is, by reducing some of the inaccurate guesses, it is less likely that the video pipeline 200 will provide output information having various anomalies, such as images have poor contrast, images having unnatural looking colors, images having various distortions (e.g., motion artifacts, clipping, etc.), and so forth.

According to another benefit, as will be explained in further detail in Section D (below), the video pipeline 200 can use an existing data structure to convey the CI data structure 202. For instance, the CI data structure 202 can "reside" in an unused field (or fields) of an existing data structure used to transmit information through the pipeline 200. A flag can be provided to signal whether or not the unused field contains the CI data structure 202 (or whether it contains meaningless, unspecified, information, or perhaps default information, such as a series of 0's). This provision has at least two advantages. First, the use of a pre-existing field of pre-existing size means that existing functional components (214, 216, 218) need not be completely re-engineered to accommodate the use of the new CI data structure 202. Further, those functional components (214, 216, 218) that may not have the ability to understand or interpret the CI data structure 202 need not handle this information. In other words, components that do not understand the CI data structure 202 are simply not affected by it. At the same time, the unobtrusive nature in which the color information is provided enables these components to automatically pass the color information along the pipeline 200. In other words, the color information is typically not lost, because it is present in existing data fields. This enables downstream components, which may be configured to utilize the color information, to receive such color information intact from such CI-unaware upstream components.

The above discussion has assumed that the image information 204 will be immediately displayed on a display device, based on the color information in the CI data structure 202. However, the CI data structure 202 also provides an efficient technique for packing color information associated with the image information 204, and thus can be used as an archival technique to store the image information 204 and associated CI data structures 202 in a space-efficient manner (while still retaining a large amount of information regarding the formatting applied to the image information 204).

More specifically, components can be configured to automatically store the CI information 202 with the image information 204. When the image information 204 is later retrieved, the reserved fields containing the CI information 202 can be unpacked and passed to the pipeline 200, thus preserving a great deal of information regarding the color structure of the image information 204 for the benefit of the downstream components.

Further, the above discussion has assumed that components in the pipeline 200 can supply missing color information for the benefit of only downstream components in the pipeline. However, a component in the pipeline can supply color information for use by an upstream component in its processing of subsequent image information. For example, consider the case where a video pipeline is applied to the task of processing and presenting a movie from an unknown video source. One of the initial components in the pipeline may not be able to determine certain features of the formatting applied to this video information, and thus may potentially initially fail to process this information in an optimal manner. However, later components in the pipeline may subsequently deduce the formatting that has been applied to the video information by the unknown video source. These downstream components can communicate with the upstream component to inform it that the subsequent signals that it receives from the same source have a prescribed formatting. The upstream component can then process the video information in a more error-free manner.

Further, the term "downstream" does not necessarily denote a fixed order of operations within a system. In general, a pipeline can be built in a dynamic manner to provide desired operations on the image information 204 by stringing together different functional components. In this context, the color information can be provided in media type data structures used for negotiations between components. If a pipeline is built from the "output end" first, the color information will flow "backwards" as the components are connected.

Figure 3:
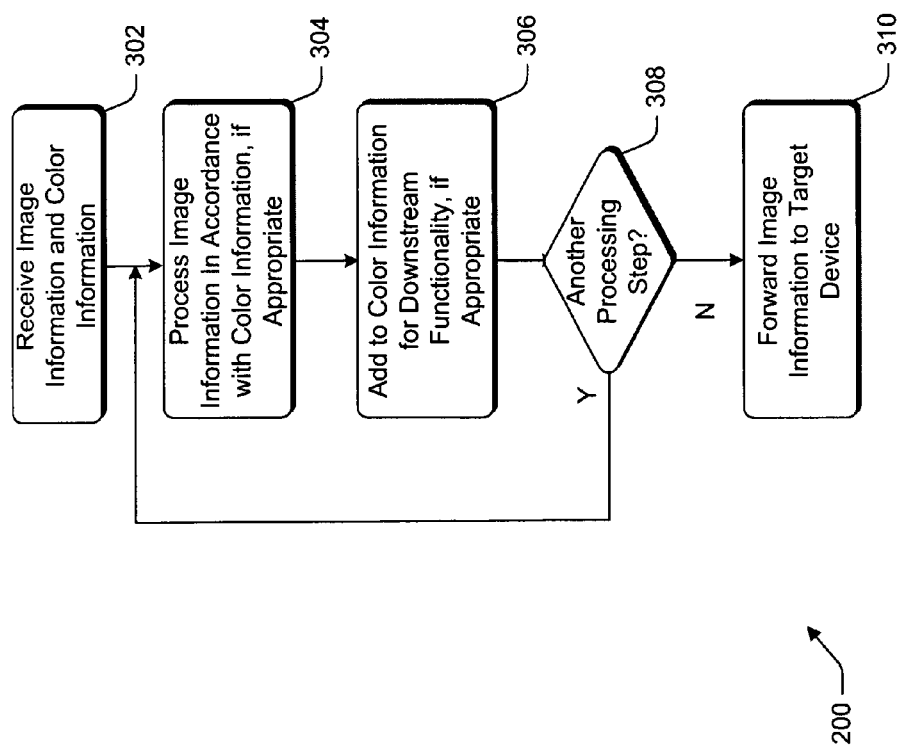
FIG. 3 is a flowchart which shows an exemplary method for processing image information using the data structure introduced in FIG. 2.

FIG. 3 describes the operation of the pipeline 200 in FIG. 2 in flow chart form. Step 302 entails initially capturing/inputting image information 204 from one or more sources 212. Step 304 entails processing the image information 204, by an appropriate functional component (214, 216, 218) of the pipeline 200, in accordance with the color information gleaned from the CI data structure 202. Step 306 entails optionally supplying color information, as deduced by the appropriate component (214, 216, 218) of the pipeline 200, to the CI data structure 202 for use by downstream components in the video pipeline 200. For instance, steps 304 and 306 correspond to processing performed by the input stage 206 in the first iteration of the loop defined by the flowchart. Step 308 determines whether steps 304 and 306 should be repeated for the next functional component (214, 216, 218) in the video pipeline 200. The process of FIG. 3 terminates with the eventual output of the image information 204 to an output device (e.g., a television, computer monitor, archival device, network target destination, and so forth) based on the CI data structure 202.

B. Exemplary Conversion Operations

Figure 4:
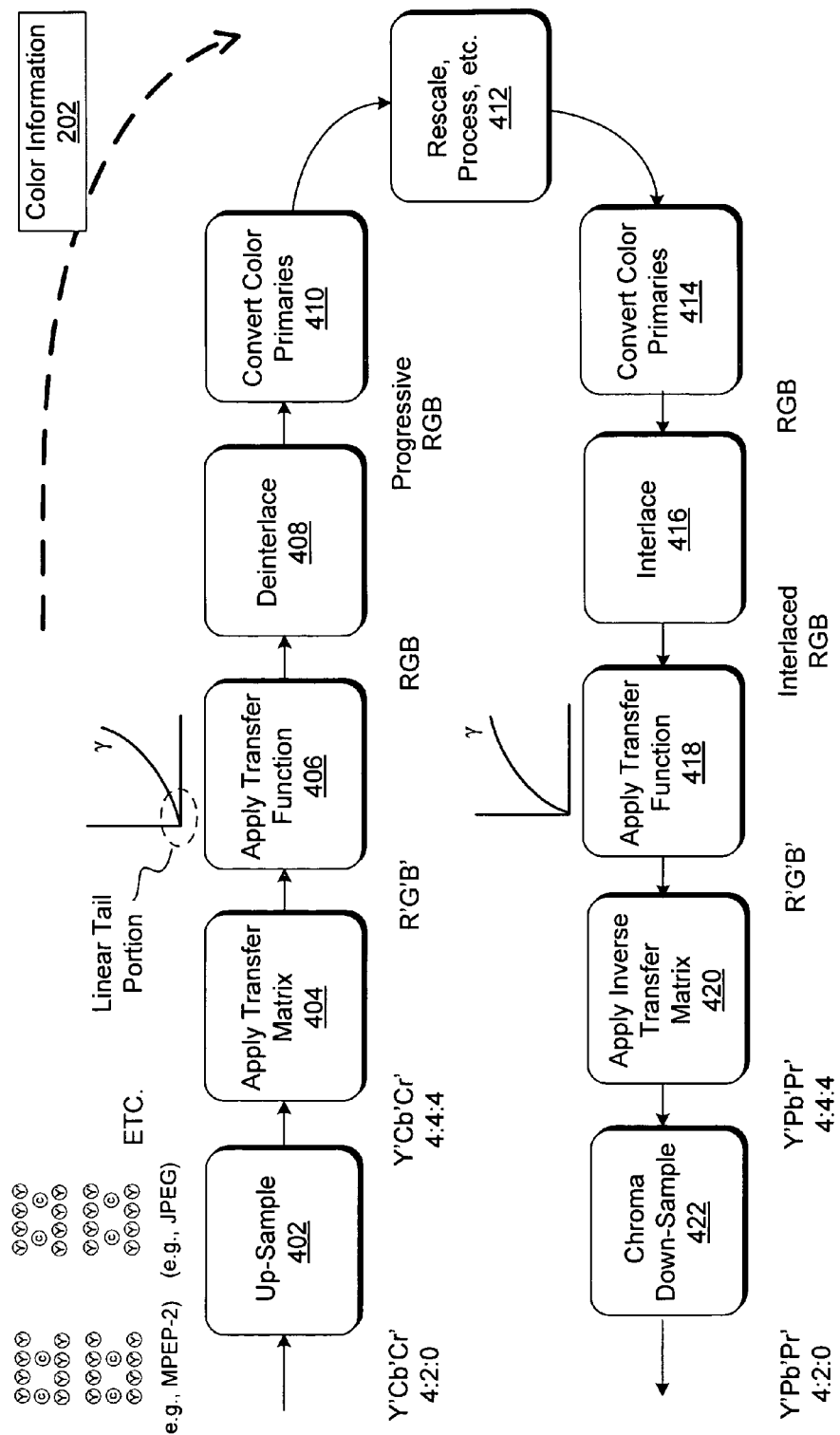
FIG. 4 is a block diagram which shows a novel technique for transforming image information to a progressive linear RGB format, and then performing processing on the image information in that format.

FIG. 4 shows a conversion operation 400 for converting the image information 204 using the video pipeline 200 of FIG. 2, or in context of another kind of pipeline. FIG. 4 therefore further expands on the use of color information 202 within a video pipeline. Other features shown in FIG. 4 illustrate advances in the video processing art, even without the use of color information 202. Namely, by way of overview, FIG. 4 shows a technique for converting image information expressed in a luma-related color space (e.g., Y'Cb'Cr') into a linear and progressive RGB space, and then performing some processing on the linear and progressive RGB data. Thereafter, the technique can convert this information back into a luma-related space (e.g., Y'Pb'Pr') for output to an output device (such as a television device which displays image information 204 in a luma-related color space, a storage device, or so forth). The processing of luma-related information 204 in the linear/progressive RGB color space departs from other approaches, which do not convert image information 204 into an interim linear RGB color space for processing in the above-summarized manner. Linear RGB processing is advantageous for a number of reasons. For instance, linear RGB processing eliminates brightness and color shift artifacts that may be incurred by processing image information in nonlinear RGB or nonlinear YUV color spaces.

The conversion operation 400 of FIG. 4 includes an exemplary series of blocks which describe the conversion steps discussed above. More specifically, the top row of blocks in this figure shows the transformation of Y'Cb'Cr' image information into a prescribed color space for processing. The bottom row of blocks shows the transformation of the processed data back into Y'Pb'Pr data (where Y'Pb'Pr can define the analog counterpart of Y'Cb'Cr').

As to the top row, block 402 indicates that Y'Cb'Cr' 4:2:0 image information is received and upsampled to Y'Cb'Cr' 4:4:4 image information. The 4:2:0 notation denotes that the chroma information (Cb'Cr') is sub-sampled relative to the luma information (Y'). The representative samples shown in FIG. 4 above block 402 indicate that different coding strategies can position the chroma samples relative to the luma samples in different respective ways. The upsampling operation interpolates the chroma information so as to produce the same amount of chroma information as luma information (e.g., to provide a 4:4:4 representation of the input image information).

Block 404 applies a matrix transformation to the Y'Cb'Cr' 4:4:4 image information to transform it into another color space, namely the R'G'B' color space.

Block 406 transforms the nonlinear R'G'B' image information into a linear form by applying a transfer function to it. As noted above, the prime symbols (') associated with the R'G'B' image information indicate that it is in nonlinear form; the absence of the primes (e.g., RGB) usually denotes linear data (except that it is also commonplace to remove the primes where it is conventionally understood that the signals being referred to represent nonlinear information). The model transfer function shown above block 406 in FIG. 4 illustrates the general shape of the function employed, which is also the general shape of the inherent transfer function of the CRT (not shown). This model transfer function also indicates that it can employ a linear tail near the V=0 portion of its curve.

Block 408 optionally performs a deinterlacing of the content to convert it from an interlaced form to a progressive format in order to correctly perform image resealing operations.

Block 410 optionally transforms the color primaries of the linear RGB information to express the information in another color space. This conversion may comprise applying a matrix transformation to the RGB information to change its color primaries to correspond to whatever primaries are desired for processing performed in downstream components in the video processing pipeline. In one example, block 410 can comprise transforming image information from one RGB-related color space to another RGB-related color space (e.g., to scRGB).

Block 412 generally represents any kind of processing of the image information having the transformed color space. This can constitute, for instance, performing processing on image information in a linear, progressive, RGB-related color space.

The bottom row of blocks in FIG. 4 generally reverses the above-described operations in the top row. Namely, after processing in block 412, block 414 optionally converts the image information into another color space, such as back to the RGB color space. Block 416 applies an operational re-interlacing of the content if it needs to be stored or displayed in an interlaced form. Block 418 applies a transfer function to again transform the RGB image information into a nonlinear form (R'G'B'). Block 420 changes the color space of the R'G'B' image information back into a format which separates its luma component (Y') from its chroma components (Pb'Pr'). Finally, block 422 optionally sub-samples the Y'Pb'Pr' image information to reduce the amount of chroma samples (Pb'Pr') relative to the amount of the luma samples (Y'). That is, this block 422 can transform Y'Pb'Pr' 4:4:4 image information (where there is a chroma sample for every luma sample) into Y'Pb'Pr' 4:2:0 image information (where there are fewer chroma samples relative to luma samples).

The CI data structure 202 can come into play in the context of FIG. 4 by providing instructions regarding the manner in which each of the processing blocks is to process the image information 204. For instance, color information can be supplied which specifies the manner in which the pipeline is to convert from the luma-related color space to the RGB-related color space, and so forth.

C. Exemplary Composition of the Color Information Data Structure

Figure 5:
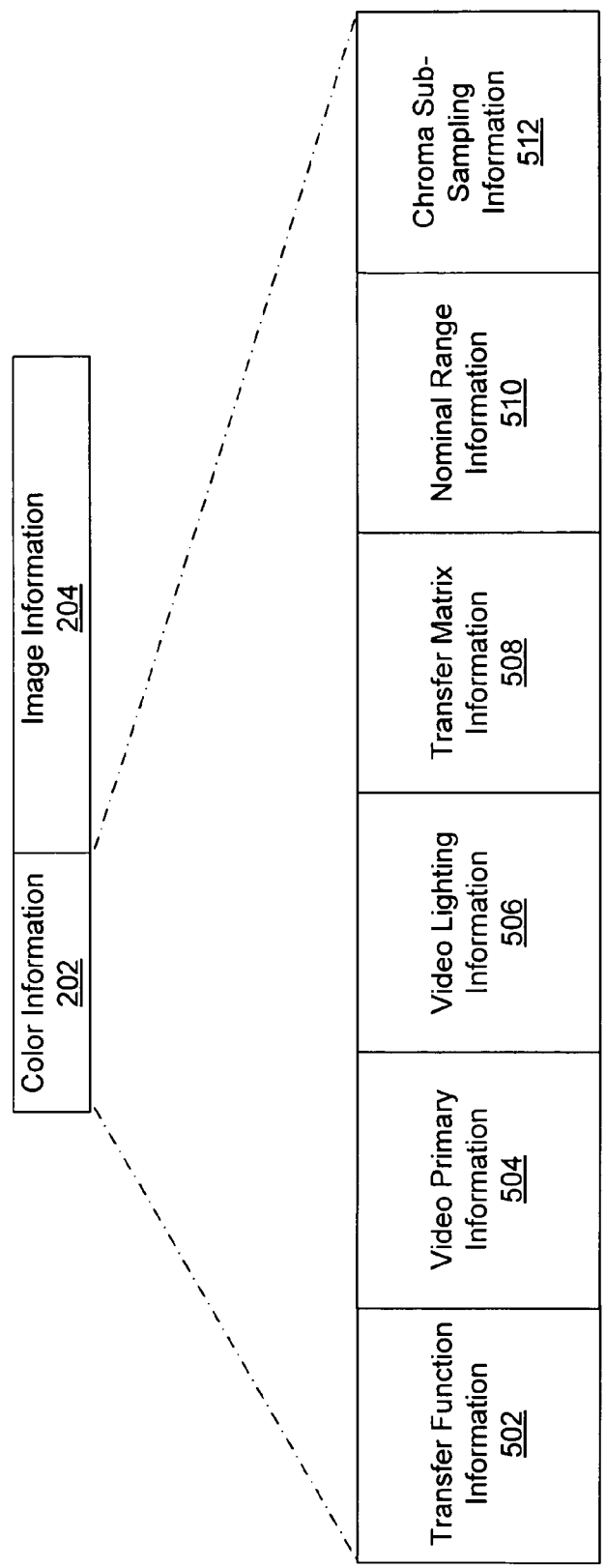
FIG. 5 shows an overview of the exemplary data structure used in the system of FIG. 2.

FIG. 5 shows one exemplary implementation of the CI data structure 202 introduced in FIG. 2. The CI data structure 202 includes a number of fields that define different aspects of the coding standards that can potentially be applied to the image information 204. The fields shown in FIG. 5 are representative rather than limiting of the type of information that can be packed into the CI data structure 202. Other implementations may omit certain fields shown in FIG. 5, or can add other fields not shown in FIG. 5.

This section provides a general overview of the fields shown in FIG. 5, followed by a detailed description of one exemplary implementation of the CI data structure 202.

To begin with, the first field 502 defines transfer function information. This information is used to define how to convert (nonlinear) R'G'B' image information 204 to (linear) RGB information (and/or vice versa).

The second field 504 defines color primaries used to encode the image information 204. For instance, this field 504 can specify the RGB response functions associated with RGB image information 204.

The third field 506 defines what video lighting assumptions apply to the image information 204. For instance, this field 506 can specify whether the image information 204 was coded for presentation in a bright office environment (which is typically the case for information that is intended for presentation on a computer monitor), as opposed to a dimly lit home environment (which is typically the case for information intended for presentation on a television within a home).

The fourth field 508 defines transfer matrices that are applicable to the image information 204. For instance, these matrices may define how to convert between the Y'Cb'Cr' color space and the R'G'B' color space, and so forth.

The fifth field 510 defines nominal range information associated with the image information 204. More specifically, this field defines whether the image information 204 provides prescribed toe room below a reference black level and/or prescribed head room above a reference white level.

Finally, a sixth field 512 defines chroma sub-sampling information that defines how the chroma information is sampled and positioned relative to the luma information.

Different coding schemes can be used to express the six fields shown in FIG. 5. According to one exemplary and non-limiting approach, a collection of bits are allocated for expressing CI data structure 202. The collection of bits are arranged in a prescribed data structure having predefined fields (or slots for receiving color information). In one exemplary case, 16 bits can be allocated to expressing the CI data structure 202. In another exemplary case, 24 bits can be allocated to expressing the CI data structure 202. Other implementations provide still other CI data structure sizes, including sizes having fewer than 16 bits, sizes having more than 24 bits, and so forth.

In the exemplary and non-limiting case where 24 bits are used, the fields (502-512) can be organized as follows. A first "enum" (an integer enumeration of values) VideoTransferFunction can be used to express the first field 502; it can be allocated 5 bits, thus occupying bits 23-19 of the 24-bit CI data structure 202. A second enum VideoPrimaries can be used to express the second field 504; it can be allocated 5 bits, thus occupying bits 18-14 of the CI data structure 202. A third enum VideoLighting can 19 be used to express the third field 506; it can be allocated 4 bits, thus occupying bits 13-10 of the CI data structure 202. A fourth enum TransferMatrix can be used to express the fourth field 508; it can be allocated 3 bits, thus occupying bits 9-7 of the CI data structure 202. A fifth enum NominalRange can be used to express the fifth field 512; it can be allocated 3 bits, thus occupying bits 6-4 of the CI data structure 202. Finally, a sixth enum VideoChromaSubsampling can be used to express the sixth field 512; it can be allocated 4 bits, thus occupying bits 3-0 of the CI data structure 202.

The remaining portion of this section provides additional details regarding one exemplary implementation of the above-described six enums. The details provided are illustrative rather than limiting; other data structures having different syntaxes can be used.

DXVA_VideoTransferFunction

The DXVA_VideoTransferFunction enum indicates the conversion function from (nonlinear) R'G'B' to (linear) RGB. It roughly corresponds to the gamma function of the image data. Some transfer functions have corrections to account for 8 bit integer quantization effects. In one exemplary implementation, 5 bits can be used to express this enum (e.g., bits 23-19 of the 24 bit CI data structure 202). An exemplary syntax of the DXVA_VideoTransferFunction enum is specified as follows:

```
typedef enum _DXVA_VideoTransferFunction
{
    DXVA_VideoTransFuncMask =
    BIT(23)|BIT(22)|BIT(21)|BIT(20)|BIT(19),
    DXVA_VideoTransFunc_Unknown = 0,
    DXVA_VideoTransFunc_10 = 1,
    DXVA_VideoTransFunc_18 = 2,
    DXVA_VideoTransFunc_20 = 3,
    DXVA_VideoTransFunc_22 = 4,
    DXVA_VideoTransFunc_22_709 = 5,
    DXVA_VideoTransFunc_22_240M = 6,
    DXVA_VideoTransFunc_24_8bit_sRGB = 7,
    DXVA_VideoTransFunc_28 = 8,
} DXVA_VideoTransferFunction;
```

The first member of this enum indicates that this field is unknown. This field may be set to a predefined value if required for a computation to proceed.

The member denoted by the suffix of "10" identifies linear RGB, having a gamma =1.0.

The members denoted by the suffixes of "18," "20," "22" and "28" denote true 1.8, 2.0, 2.2 and 2.8 gamma, e.g., for L'=pow(L, 1/gamma) for L=0 . . . 1. The standard BT470-2 SysM uses gamma 2.2.

The member denoted by the suffix of "22_709" pertains to a gamma 2.2 curve with a linear range in the low range appropriate for formats defined by standards BT1361, BT709, SMPTE296M, SMPTE170M, BT470, SMPTE274M, and so forth.

The member denoted by the suffix "22_240M" pertains to a gamma 2.2 curve with a linear range in the low range appropriate to SMPTE240M, interim 274M, and so forth.

The member denoted by suffix "22_8bit_sRGB" pertains to a gamma 2.4 curve with a linear range in the low range which allows it to match an accurate 2.2 gamma 8-bit curve.

FIG. 6 provides further exemplary details appropriate to the DXVA_VideoTransferFunction enum.

DXVA_VideoPrimaries

The DXVA_VideoPrimaries enum lists the color primaries which, in turn, identify which RGB basis functions are used in the image information 204. In one exemplary implementation, 5 bits can be used to express this enum (e.g., bits 18-14 of the 24-bit CI data structure 202).

An exemplary syntax of the DXVA_VideoPrimaries enum is specified as follows:

```
typedef enum _DXVA_VideoPrimaries
{
    DXVA_VideoTransFuncMask = BIT(18)|
    BIT(17)|BIT(16)|BIT(15)|BIT(14),
    DXVA_VideoPrimaries_Unknown = 0,
    DXVA_VideoPrimaries_BT601 = 1,
    DXVA_VideoPrimaries_BT709 = 2,
    DXVA_VideoPrimaries_BT470_2_SysM = 3,
    DXVA_VideoPrimaries_BT470_2_SysBG = 4,
    DXVA_VideoPrimaries_SMPTE170M = 5,
    DXVA_VideoPrimaries_SMPTE240M = 6,
    DXVA_VideoPrimaries_EBU3213 = 7,
    DXVA_VideoPrimaries_SMPTE_C = 8,
} DXVA_VideoPrimaries;
```

The first member of this enum indicates that this field is unknown. This field may be set to a predefined value if required for a computation to proceed (e.g., the default values may be set to the primaries specified in the standard BT 709).

The member having the suffix "BT709" defines color primaries associated with the BT709 standard (which is also applicable to the standards sRGB, scRGB, etc.).

The member having the suffix "BT470_2_SysM" defines original NTSC primaries.

The members having the "BT601," "BT470_2_SysBG," "SMPTE240M," and "EBU3213" suffixes define various respective primaries associated with these standards.

The member having the suffix "SMPTE170M" defines analog NTSC primaries (which are presently infrequently used).

The member having the suffix "SMPTE_C" defines analog '79 NTSC primaries.

FIG. 7 provides further exemplary details appropriate to the DXVA_VideoPrimaries enum.

DXVA_VideoLighting

The DXVA_VideoLighting enum describes the intended viewing lighting conditions. This information can also be used to alter the gamma to generate a comparable experience in a different lighting condition. In one exemplary implementation, 4 bits can be used to express this enum (e.g., bits 13-10 of the 24-bit CI data structure 202).

An exemplary syntax of the DXVA_VideoLighting enum is specified as follows:

```
typedef enum _DXVA_VideoLighting
{
    DXVA_VideoTransFuncMask = BIT(13)|BIT(12)|BIT(11)|BIT(10),
    DXVA_VideoLighting_Unknown = 0,
    DXVA_VideoLighting_bright=1,
    DXVA_VideoLighting_office=2,
    DXVA_VideoLighting_dim=3,
    DXVA_VideoLighting_dark=4,
} DXVA_VideoLighting;
```

The first member of this enum indicates that this field is unknown. This field may be set to a predefined value if required for a computation to proceed (e.g., the default values may be set to assume that dim viewing conditions were intended.

The member with the suffix "bright" may correspond outside lighting conditions.

The member with the suffix "office" may correspond to medium brightness levels associated with home office conditions.

The member with the suffix "dim" may correspond to dim brightness levels associated with dimly lit viewing conditions The member with the suffix "dark" may correspond to dark brightness levels associated with movie theatre viewing conditions.

DXVA_VideoTransferMatrix

The DXVA_VideoTransferMatrix enum describes the conversion matrix used to transform image information 204 from the Y'Cb'Cr' color space to (studio) R'G'B' color space. In one exemplary implementation, 3 bits can be used to express this enum (e.g., bits 9-7 of the 24-bit CI data structure 202).

An exemplary syntax of the DXVA_VideoTransferMatrix enum is specified as follows:

```
typedef enum _DXVA_VideoTransferMatrix
{
    DXVA_VideoTransferMatrixMask = BIT(9)|BIT(8)|BIT(7),
    DXVA_VideoTransferMatrix_Unknown = 0,
    DXVA_VideoTransferMatrix_BT709 = 1,
    DXVA_VideoTransferMatrix_BT601 = 2,
```

-continued

```
        DXVA_VideoTransferMatrix_SMPTE240M = 3,
    } DXVA_VideoTransferMatrix;
```

The first member of this enum indicates that this field is unknown. This field may be set to a predefined value if required for a computation to proceed (e.g., the default values may be set to the transfer matrix specifications used in standard BT601 for standard definition image information 204, and standard BT709 for high definition image information 204).

The member with the suffix "BT709" defines a transfer matrix specified in the BT709 standard.

The member with the suffix "BT601" defines a transfer matrix specified in the BT601 standard.

The member with the suffix "SMPTE240M" defines a transfer matrix specified in the SMPTE240M standard (which is a high definition standard that is not commonly used today).

FIGS. 8 and 9 provide further exemplary details appropriate to the DXVA_VideoTransferMatrix enum.

DXVA_NominalRange

The DXVA_NominalRange enum describes whether the data includes head room (values beyond-reference 1.0 white) and toe room ("superblacks" below the reference 0.0 black). For instance, to ensure proper interpretation of the image information 204, it is useful to differentiate wide gamut R'G'B' (blackpoint at 16, 16, 16, whitepoint at 235, 235, 235) versus normal sRGB. In one exemplary implementation, 3 bits can be used to express this enum (e.g., bits 6-4 of the 24 bit CI data structure 202).

An exemplary syntax of the DXVA_NominalRange enum is specified as follows:

```
typedef enum _DXVA_NominalRange
{
    DXVA_VideoChromaSubsamplingMask = BIT(6)|BIT(5)|BIT(4),
    DXVA_NominalRange_Unknown = 0,
    DXVA_NominalRange_Normal = 1,
    DXVA_NominalRange_Wide = 2
} DXVA_NominalRange;
```

The first member of this enum indicates that this field is unknown. This field may be set to a predefined value if required for a computation to proceed.

The member with the suffix of "Normal" defines normalized chroma [0 . . . 1] that maps to 0 . . . 255 (8 bit) or 0 . . . 1023 (10 bit) image information 204.

The member having the suffix "Wide" defines normalized chroma [0 . . . 1] that maps to 16 . . . 235 (8 bit) or 64 . . . 940 (10 bit).

DXVA_VideoChromaSubsampling

The DXVA_VideoChromaSubsampling enum describes the chroma encoding scheme applied to the Y'Cb'Cr' data. The "cosite" variations indicate that the chroma samples are aligned with the luma samples. 4:2:0 data typically has chroma aligned in one or more directions with the luma data. 4:4:4, 4:2:2 and 4:1:1 data are cosited in both directions. In one exemplary implementation, 3 bits can be used to express this enum (e.g., bits 3-0 of the 24-bit CI data structure 202).

An exemplary syntax of the DXVA_VideoChromaSubsampling enum is specified as follows:

```
typedef enum _DXVA_VideoChromaSubsampling
{
    DXVA_VideoChromaSubsamplingMask =
        BIT(3)|BIT(2)|BIT(1)|BIT(0),
    DXVA_VideoChromaSubsampling_Unknown = 0,
    DXVA_VideoChromaSubsampling_ProgressiveChroma = 0x8,
    DXVA_VideoChromaSubsampling_Horizontally_Cosited = 0x4,
    DXVA_VideoChromaSubsampling_Vertically_Cosited = 0x2,
    DXVA_VideoChromaSubsampling_AlignedChromaPlanes=0x1
        (can only be 0 if vertically cosited)
} DXVA_VideoChromaSubsampling;
```

The first member of this enum indicates that this field is unknown. This field may be set to a predefined value if required for a computation to proceed.

The member having the suffix "ProgressiveChroma" defines chroma samples that are temporally interpreted as progressive content (e.g., from the same frame, rather than from two temporally offset fields).

The member having the suffix "Horizontally_Cosited" defines chroma samples that are horizontally aligned on multiples of the luma samples.

The member having the suffix "Vertically_Cosited" defines chroma samples that are vertically aligned on multiples of the luma samples.

The member having the suffix "AlignedChromaPlanes" defines the Pb and Pr (or Cb and Cr) planes as having the same phase alignment. This flag is 0 if the data is vertically cosited.

Figure 10:
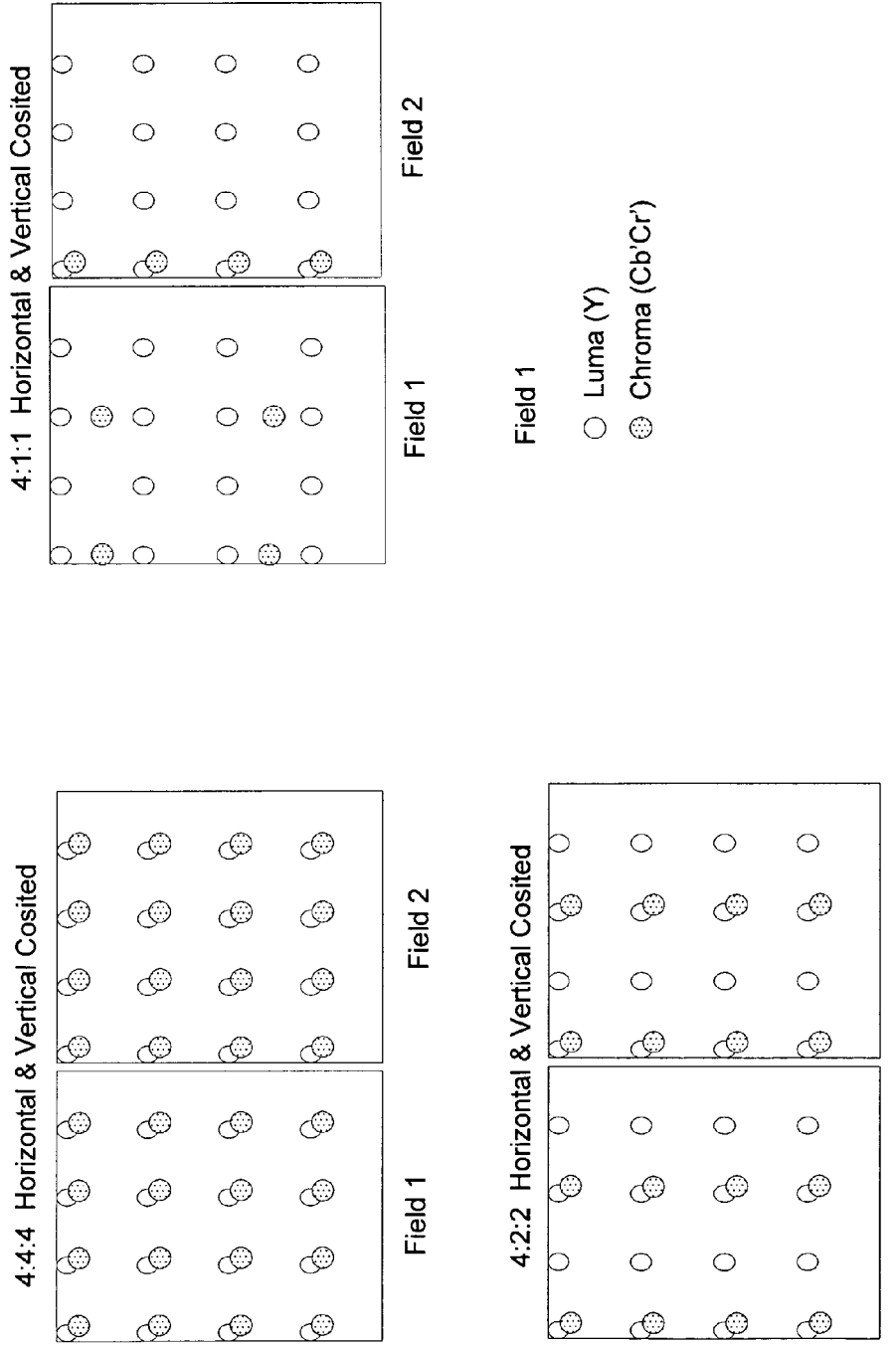
Figure 12:
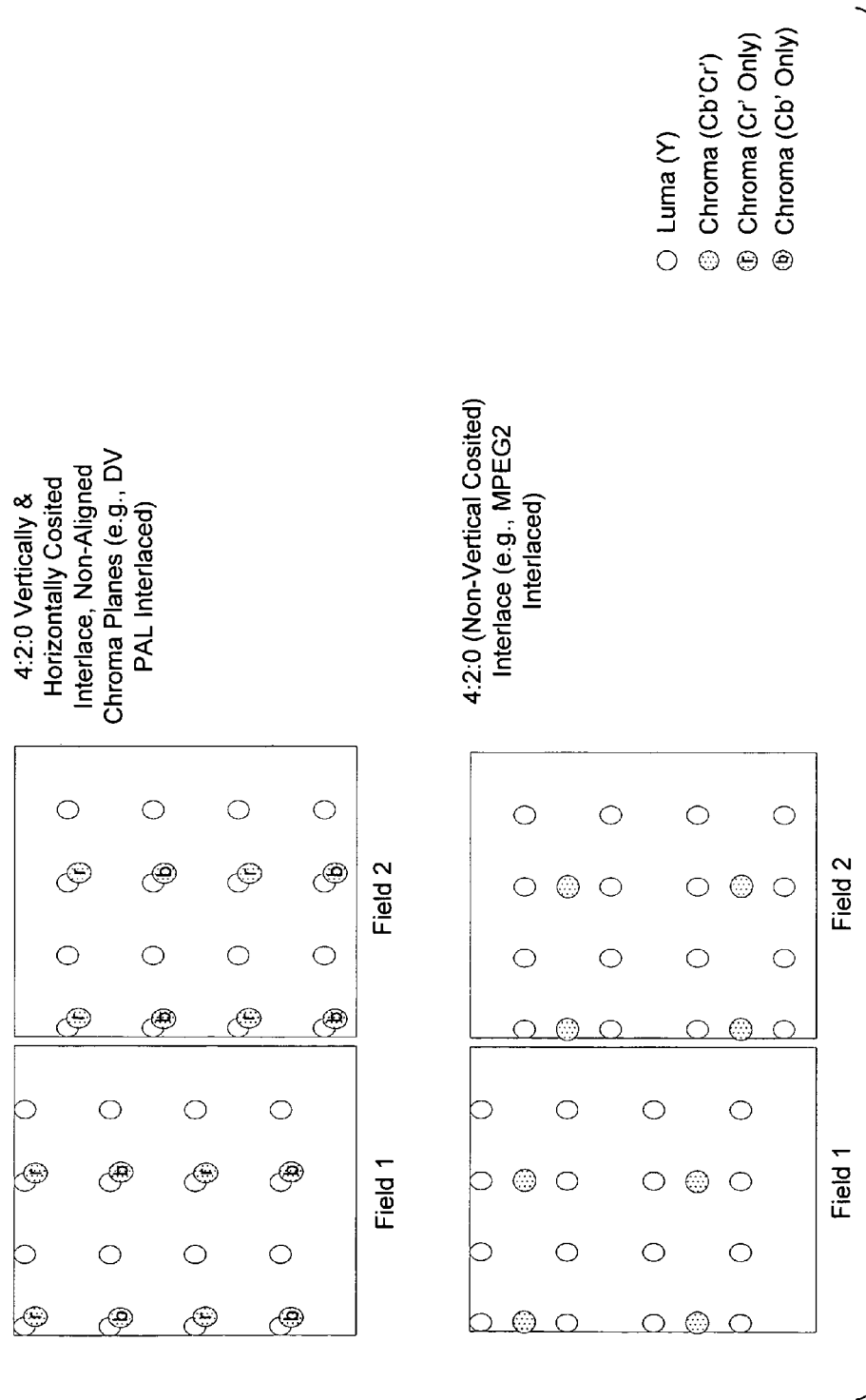

FIGS. 10-12 provide further exemplary details appropriate to the DXVA_VideoChromaSubsampling enum. Namely, these figures provide a summary of the locations of the chroma samples relative to the luma samples in typical Y'Cb'Cr' image information 204.

D. One Exemplary Application of the Color Information Data Structure

There are many applications of the coding strategy described in the previous sections. FIGS. 13-16 illustrate one exemplary application using an application programming interface (API) referred to as DeinterlaceBltEx.

By way of overview, the DeinterlaceBltEx functionality provides logic which allows plural operations to be performed together as a single operation, such as a compositing operation to be performed together with a deinterlacing operation. A compositing operation refers to the combination of principal image stream information with image sub-stream information. Image stream information refers to a primary (or principal) sequence of image frames. Image sub-stream information refers to auxiliary image information that can be presented along with the image frames of the principal image stream information. In one example, the image sub-stream information may correspond to close-captioning data. The close-captioning information is combined with the principal image stream information to form composite image information for display. A deinterlacing operation refers to a technique for combining successive image fields that have been created in an interlacing operation to provide a progressive (non-interlaced) representation of an image frame. The DeinterlaceBltEx functionality also allows other kinds of operations to be performed at the same time. (Alternatively, so-called DeinterlaceBlt functionality can be used, which is configured to perform the above-identified operations in series.)

In one exemplary implementation, the DeinterlaceBltEx functionality provides a data structure having an unused portion (or a partially unused portion) that can be used to convey the CI data structure 202. That is, in one exemplary and non-limiting implementation, the portion can define a 32 bit word. A 24 bit portion of this word can be used to convey the six fields of information shown in FIG. 5. Another portion of the existing structure (e.g., the remaining 8 bits) can be used to convey other aspects of the image information 204, such as whether the image information 204 is coded in interlaced or progressive format, and so forth.

More specifically, the color information can serve numerous roles in the context of the DeinterlaceBltEx operation. As to the issue of color space processing, the color information specified in the CI data structure 202 can specify: (a) what color space conversion(s) (if any) are to be performed on input image information supplied to the DeinterlaceBltEx functionality; (b) what color space is to be used to perform various processing tasks on the image information; and (c) what color space is to be used to provide output image information, and so forth. Possible color spaces that can be selected for these tasks can include any kind of RGB-related color space, any kind of luma-related color space (e.g., YUV), and so forth. Further, possible color spaces can be either in linear form or nonlinear (e.g., gamma-compensated) form.

For example, in one scenario, one or more streams of image information are converted from a luma-related color space into a linear RGB-related color space. Certain operations can then be performed on the image information in the linear RGB-related color space, to provide an output also within the linear RGB-related color space. Thus, this series of operations can implement the technique shown in FIG. 4 (as previously described). In another scenario, one or more streams of image information can be received and processed in a luma-related color space, to provide an output also within a luma-related color space. In another scenario, one or more streams of image information can be converted from one kind of RGB-related color space to another kind of RGB color space, or from one kind of luma-related color space to another kind of luma-related color space. These are merely illustrative examples of a wide variety of processing options made available by the DeinterlaceBltEx functionality. In any of these cases, the color information in the CI data structure 202 can provide instructions which govern the color space selections applied by the DeinterlaceBltEx functionality.

Moreover, the unique capabilities of the DeinterlaceBltEx functionality allow color space conversion to be performed in a same operation as other operations performed on the image information (such as deinterlacing and compositing). For example, image information can be converted from a luma-related color space to an RGB-related color space in a same operation as this image information is deinterlaced and composited with a video sub-stream. Alternatively, certain operations performed on image information can also be performed in series. For instance, in one example described fully below, deinterlacing and compositing can be performed in a single operation within the YUV color space, followed by a conversion of the output result to an RGB-related color space.

As a final introductory comment, the DeinterlaceBltEx functionality can act on separate image information streams (such as one or more principal video streams and/or one or more video sub-streams) expressed in different color spaces. The image information streams can have their own CI data structures 202 associated therewith. The CI data structures 202 can include information which defines how the separate streams can be converted into a common color space in order for operations to be performed on the separate streams (such as deinterlacing, compositing, and so forth).

Figure 13:
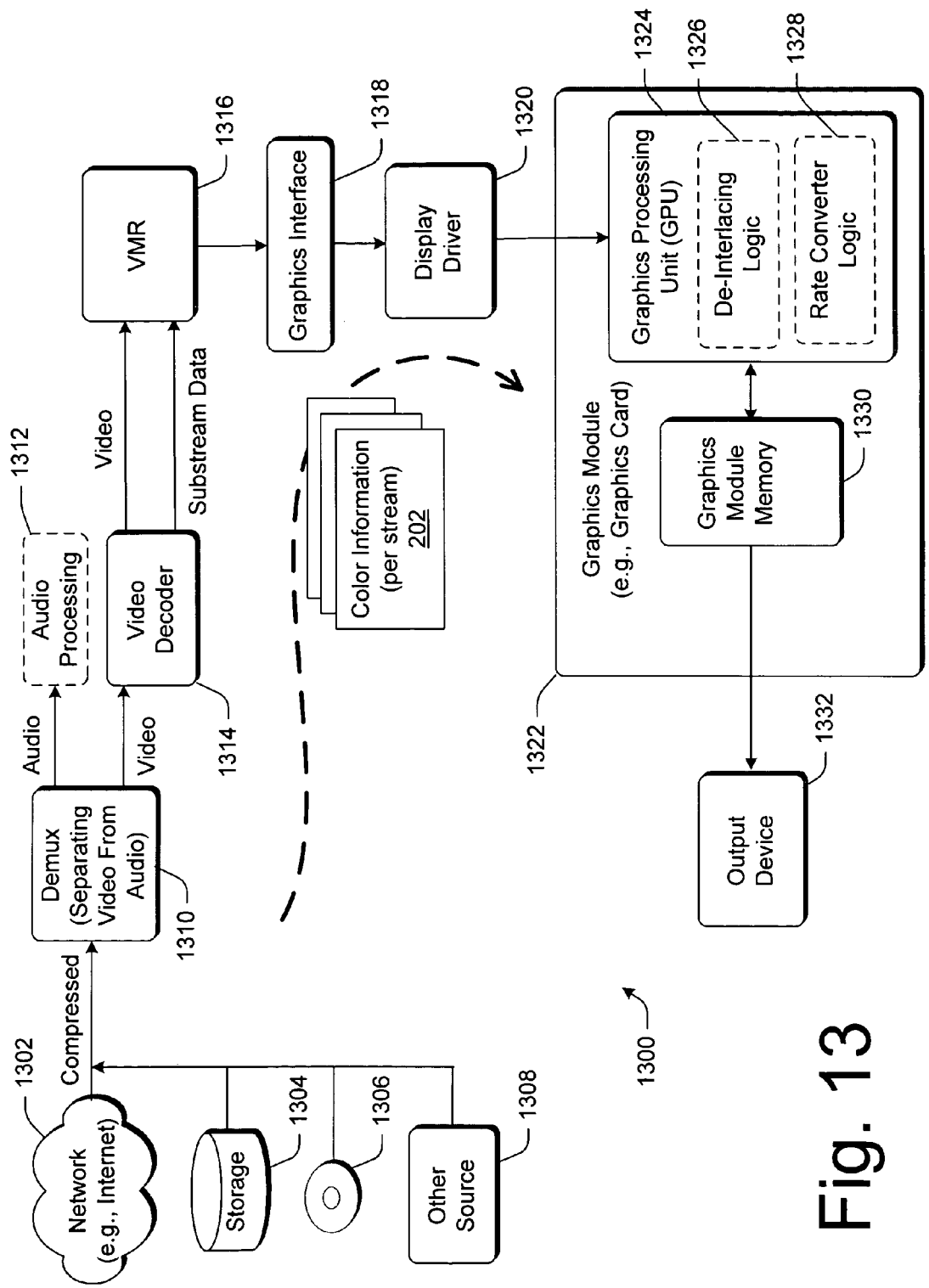
FIG. 13 shows one exemplary system for implementing the general features of FIG. 2.

With the above introduction, FIG. 13 shows an overview of an exemplary system 1300 that can be used to implement aspects of the video pipeline 200 shown in FIG. 2. The system 1300 can rely on the DirectX® family of technologies produced by Microsoft® Corporation of Redmond, Wash. The DirectX family includes, DirectX Video Acceleration (DirectX-VA), Direct3D, DirectDraw, etc. However, the principles described above can be performed using other kinds of rendering technologies that run on other kinds of technical platforms. The system 1300 can represent a personal computer, a game console (such as Microsoft® Corporation's Xbox™ gaming console), or any other kind of device.

To begin with, the system 1300 accepts image information from any one of a number of sources. For example, the apparatus 1300 can accept image information from a network 1302 (such as a remote source coupled to the Internet), any kind of database 1304, any kind of computer readable disc media 1306 (such as an optical disk, DVD, etc.), or some other source 1308 (such as any one of the sources associated with sources 212 shown in FIG. 204). In any case, the received information may contain a combination of image information and audio information. A demux unit 1310 separates the audio information from the image information. Audio processing functionality 1312 processes 11 the audio information.

An image decoder 1314 processes the image information. The image decoder 1314 can convert the compressed image information from its received format to some other format, as well as perform initial resizing or other operations on this information. The output of the image decoder 1314 can include so-called pure image information as well as image sub-stream information. The pure image information constitutes the principal image stream to be rendered on the display device. The image sub-stream information can constitute any supplemental information associated with the pure image information, such as close-captioning information, any kind of graphical overlay information (such as various graphical editing controls), various kinds of sub-images presented by DVD players, and so on).

In one exemplary implementation, a video mixing renderer (VMR) module 1316 performs a central role in the processing of the thus-received image information. By way of overview, the VMR module 1316 interacts with a graphics interface 1318 and a display driver 1320, which, in turn, controls a graphics module 1322. As will be described in greater detail below, this interaction involves probing the capabilities of the graphics module 1322. This interaction also involves coordinating the processing of the image information by the graphics interface 1318, display driver 1320, and graphics module 1322. In one implementation, the graphics interface 1318 can be implemented using the DirectDraw functionality provided by Microsoft® Corporation's DirectX. DirectDraw serves in this context as a messaging conduit for communicatively coupling the VMR module 1316 to the graphics module 1322. The graphics module 1322 itself can constitute a fixed module within a computer or like device, or it can constitute a detachable unit, such as a graphics card. The vertical chain of functionality represented by the VMR module 1316, graphics interfaces 1318, display driver 1320, and graphics module 1322 can be divided into a user mode and a kernel mode. The user mode refers to aspects of the programming functionality that can be manipulated by the user via various interfaces. The kernel mode represents aspects of the programming functionality that cannot be directly manipulated by the user.

The graphics module 1322 itself includes one or more graphics processing units (GPUS) 1324. A GPU 1324 is generally a processing device like the CPU. The GPU 1324 is commonly allocated to information-intensive rendering tasks that are repetitively performed by the implementing apparatus 1300. Allocating these repetitive or information-intensive tasks to the GPU 1324 frees the CPU (not shown) to perform other tasks, and thus improves the performance of the apparatus 1300. Two exemplary tasks that this implementation allocates to the GPU 1324 are deinterlacing and rate conversion. These functions are represented by deinterlacing logic 1326 and rate converter logic 1328. The deinterlacing logic 1326 combines two or more fields of image information together to form a frame of image information. The rate converter logic 1328 modifies the frame rate of a sequence of image frames. The GPU 1324 can perform many additional processing tasks.

The GPU 1324 can interact with a local memory 1330 associated with the graphics module 1322. This local memory 1330 can serve any number of storage-related purposes. For instance, this memory 1330 can store a final image surface which is then forwarded to a display device 1332.

FIG. 13 shows that the CI data structure 202 can be passed along the series of functional components shown in FIG. 13, in a manner similar to that described in the context of FIG. 2. Namely, the CI data structure 202 has a uniform structure as it passes through the pipeline defined by the system 1300. Individual functional components within the system 1300 can utilize the color information in the CI data structure 202, or can potentially supplement the color information in the CI data structure 202 for the benefit of downstream functional components. For instance, as to the issue of color space processing, the color information can define: (a) what color space conversion(s) (if any) are to be performed (e.g., YUV to RGB), and how these conversions are to be performed; (b) what color space is to be used to perform various processing tasks on the image information; and (c) what color space is to be used to provide output image information, and so forth. FIG. 13 shows that plural CI data structures 202 can play a role in the processing performed in the system 1300; for instance, each stream of image information processed by the system 1300 can have its own data structure 202 associated therewith. These CI data structures 202 can coordinate the conversion of different streams of image information into a common color space.

Further details regarding the exemplary manner in which the CI data structure 202 can be integrated into the DeinterlaceBltEx framework will be set forth below.

Figure 14:
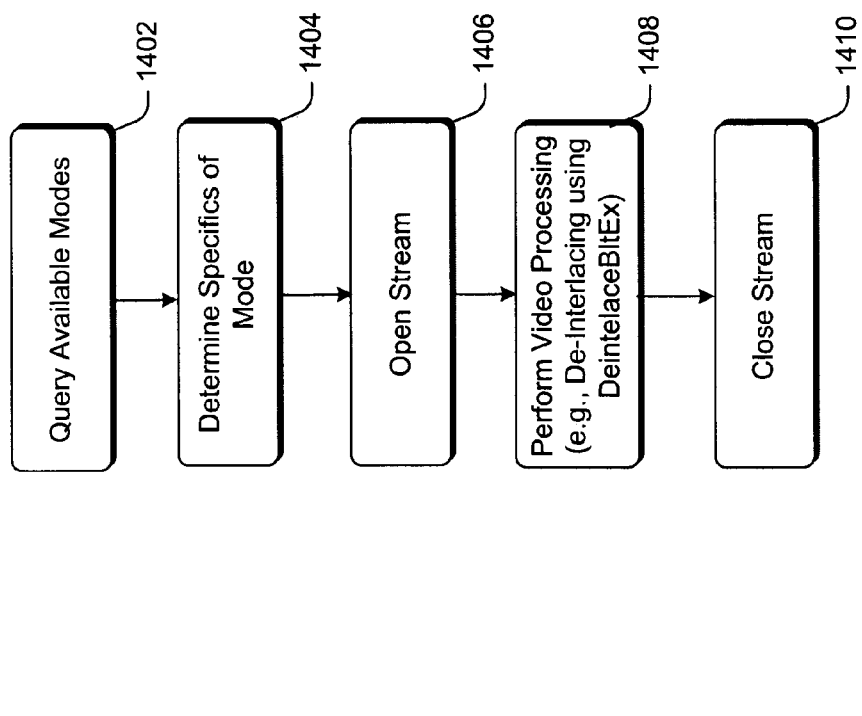
FIG. 14 is a flowchart which shows an exemplary method of operation of the system of FIG. 13.

To begin with, FIG. 14 shows an overview 1400 of the operation of the apparatus 1300 shown in FIG. 13. In step 1402, the VMR module 1316 queries the display driver 1320 and graphics module 1322 regarding what processing modes it supports. After it receives a reply, in step 1404, the VMR module 1316 sends another inquiry to find out more specific information regarding the capabilities of the display driver 1320 and associated graphics module 1322. Steps 1402 and 1404 are discussed in greater detail below under the general heading of "preliminary information processing."

After investigating the capabilities of the attached hardware and associated interfaces, the VMR module 1316 opens an image stream object (in step 1408) so that image information and control information can be forwarded to the hardware. Then, in step 1408, the VMR module 1316 coordinates the execution of one or more image processing functions by the hardware (e.g., by the graphics module 1322). One such function is deinterlacing. Another such function is sub-stream compositing. Deinterlacing can be combined with compositing as described above, or either function can be performed separately depending on the received information. For instance, if progressive image information has been received, there is no need to perform deinterlacing; in this case, the VMR module 1316 may simply resize the object, add image sub-stream information to it, or perform some other function or combination of functions. Many other functions are be implemented besides deinterlacing and compositing.

Finally, in step 1410, the VMR module closes the image stream that it opened in step 1406. This step 1410 may be in response to a command given by the user, or simply in response to running out of streaming image information, etc.

The following discussion presents more detailed information regarding selected steps referenced above.

Initialization Steps

In step 1402 described above, the VMR module 1316 asks the display driver 1320 what processing functionality that it supports with respect to an input image format. When the display driver 1320 responds, the VMR module 1316 sends a request for more specific information regarding the requirements of the display driver 1320 for a particular mode. The display driver 1320 responds by specifying various information within an information structure. Such information identifies a number of forward reference samples required, a number of backward reference samples requested, a format of the output frame, etc. A flag is also included in this information structure that indicates whether support for combined deinterlacing and compositing is supported by the graphics module 1322 and associated interfaces. This flag is referred to as the DXVA_ImageProcess_Sub-streams flag in one exemplary implementation.

Further, in order to correctly support the combined deinterlacing and compositing, the graphics module 1322 and associated interfaces and drivers should be capable of independently stretching (horizontally and/or vertically) both the image frame that is being deinterlaced as well as the supplied image sub-streams. This is required in one implementation because the pixel aspect ratio of the principal image and the video sub-streams may be different and non-square in nature. The display driver 1320 can communicate its ability to handle this functionality by returning DXVA_VideoProcess_StretchX and DXVA_VideoProcess_StretchY flags that convey its ability to stretch the images, in addition to the DXVA_VideoProcess_Sub-streams flag.

Further still, the DeinterlaceBltEx DDI supports enhanced color information for each source and destination surface (where a "source surface" defines input image information, and a "destination surface" or "target surface" defines output image information produced by the DeinterlaceBltEx operation). The display driver 1320 can indicate the level of support it has for this new color information via various color-related flags, such as the following flags:

DXVA_VideoProcess_SubStreamsExtended,
DXVA_VideoProcess_YUV2RGBExtended, and
DXVA_VideoProcess_AlphaBlendExtended.

Support for the DXVA_VideoProcess_SubStreamsExtended flag indicates that the system 1300 can perform color adjustments to the source video information and the sub-stream information, as the video information is deinterlaced, composited with the sub-stream information, and written to the destination surface.

Support for the DXVA_VideoProcess_YUV2RGBExtended flag indicates that the system 1300 is capable of performing a color space conversion operation (e.g., YUV-to-RGB) as the deinterlaced and composited pixels of the image information are written to the destination surface using the color information that is specified for the source and destination surfaces.

Support for the DXVA_VideoProcess_AlphaBlendExtended flag indicates that the system 1300 is capable of performing an alpha blend operation with the destination surface when the deinterlaced and composited pixels of the image information are written to the destination surface.

Deinterlacing Step

The VMR module 1316 uses the above-described DeinterlaceBltEx functionality to coordinate the execution of deinterlacing and compositing by the graphics module 1322. More specifically, this DeinterlaceBltEx functionality can be implemented as a single call to the display driver 1320, even though it technically involves more than one fundamental operation (color space conversion, deinterlacing, compositing, etc.). The DeinterlaceBltEx functionality writes the output of its operation to a specified destination surface.

More specifically, the VMR module 1316 forwards the following data structure to the display driver 1320 to implement the DeinterlaceBltEx functionality.

```
HRESULT
DeinterlaceBltEx(
  [in] HDXVA_DeinterlaceStream hDiStrm
  [in] REFERENCE_TIME rtTargetFrame,
  [in] RECT* prcTargetRect,
  [in] DXVA_AYUVsample2 BackgroundColor,
  [in] DWORD DestinationFormat,
  [in] DWORD DestinationFlags,
  [in] LPDDSURFACE lpDDSDstSurface,
  [in] LPDXVA_VideoSample2 lpDDSrcSurfaces,
  [in] DWORD dwNumSurfaces,
  [in] FLOAT Alpha /*0.0F transparent, 1.0F opaque */
);
```

In this structure, the rtTargetFrame parameter identifies the temporal location of an output frame within a sequence of input frames. If only deinterlacing is being performed, the target time should coincide with one of the rtStart times or midpoint times, (rtStart+rtEnd)/2, of a reference sample. If a frame rate conversion is being requested, the rtTargetFrame time may be different from any of the rtStart or midpoint times of the reference samples.

The prcTargetRect parameter identifies the location within the destination surface that the DeinterlaceBltEx operation should write to. In one implementation, the output should be restricted to the pixels within this rectangle; that is, every pixel within the prcTargetRect should be written to, and pixels outside the prcTargetRect should not be modified in any way.

The BackgroundColor parameter identifies a color of the background upon which all the video stream and sub-streams are composed.

The DestinationFormat parameter contains extended color information relating to the destination surface.

The DestinationFlags parameter contains a collection of flags that indicate changes in the destination-related parameters from the previous call to DeinterlaceBltEx. These flags reflect changes to the background color, extended color information, target rectangle or the planar alpha parameter and are provided to aid optimizing the driver code.

The destination surface can be an off-screen plain surface located in video memory (e.g., local memory 1330). The pixel format of the destination surface can be the one indicated in a d3dOutputFormat field of the data structure returned to the VMR module 1316 in the initialization steps. In one exemplary implementation, the destination surface specified in the structure can be in a Y-related color space (e.g., YUV).

The lpDDSrcSurfaces parameter points to an array of DXVA_VideoSample2 structures. The SampleFormat field in this structure indicates whether the sample is a reference for a deinterlace operation or a video sub-stream sample that needs to be combined with the deinterlaced video frame. Video sub-stream samples should have the DXVA_SampleSub-stream value for their sample format.

More specifically, an exemplary VideoSample2 structure is identified below.

```
typedef struct _DXVA_VideoSample2 {
  REFERENCE_TIME      rtStart;
  REFERENCE_TIME      rtEnd;
  DWORD               SampleFormat;
  DWORD               SampleFlags
  VOID*               lpDDSSrcSurface;
  RECT                rcSrc;
  RECT                rcDst;
  DXVA_AYUVsample2    Pal[16];
} DXVA_VideoSample2,  *LPDXVA_VideoSample2.
```

In addition to indicating whether the sample is interlaced or progressive, the SampleFormat field in the above-identified data structure defines where the CI data structure 202 can be expressed. Adding the CI data structure 202 to the SampleFormat field does not increase the size of the VideoSample2 data structure or otherwise require re-engineering of the DeinterlaceBltEx functionality. As such, "shoehorning" the CI data structure 202 into this data structure represents a particularly efficient manner of conveying color information through the video pipeline, including to the graphics module 1322.

For reference video samples, the rtStart and rtEnd fields indicate the temporal location of the sample. For video sub-stream samples, these fields are cleared to zero.

The source and destination rectangles are used for subrectangle deinterlacing or stretching Note that stretching of video sub-streams is independent of the video stream and that support for stretching is mandatory in one implementation. For the palettized video sub-stream pixel formats, a PAL field of the DXVA_VideoSample2 structure contains 16 palette entries that can be used when compositing the sub-stream sample. For non-palettized pixel formats the palette will be cleared to zero and can be ignored.

Each input sample contains a collection of flags that indicate changes in the current sample from the previous sample. These flags reflect changes to the palette, color information, source, and destination rectangles of each sample and are provided to aid optimizing the driver code.

Continuing with the description of the DeinterlaceBltEx structure, the dwNumSurfaces parameter indicates the number of elements in the 1pDDSrcSurface array. The video reference samples will be first in the array followed by the video sub-streams in Z-order. In one exemplary implementation, the number of video sub-streams passed to the driver can range from 0 to 15. Most often when DeinterlaceBltEx is called, the driver will be passed 0 or 1 video sub-streams.

Finally, the Alpha parameter indicates a planar transparency value that can be applied to the composite background color, video stream, and sub-stream image as it is written to the destination surface.

It should be noted that the DeinterlaceBltEx functionality can be called by the VMR module 1316 when progressive video and multiple image sub-streams are received. This can occur, for instance, when the VMR module 1316 is used for DVD playback that contains a mixture of progressive and interlaced video. In this case, the display driver 1320 will not attempt to deinterlace the video stream (because it is already in the progressive format); rather, the VMR module 1316 can be configured to combine the video stream with any given sub-streams, resizing each stream as desired or required. (If a deinterlace mode that needs multiple reference samples is being used with progressive video, the multiple reference samples will still be sent to the display driver 1320; however, each reference sample will refer to the same progressive video frame.)

Figure 15:
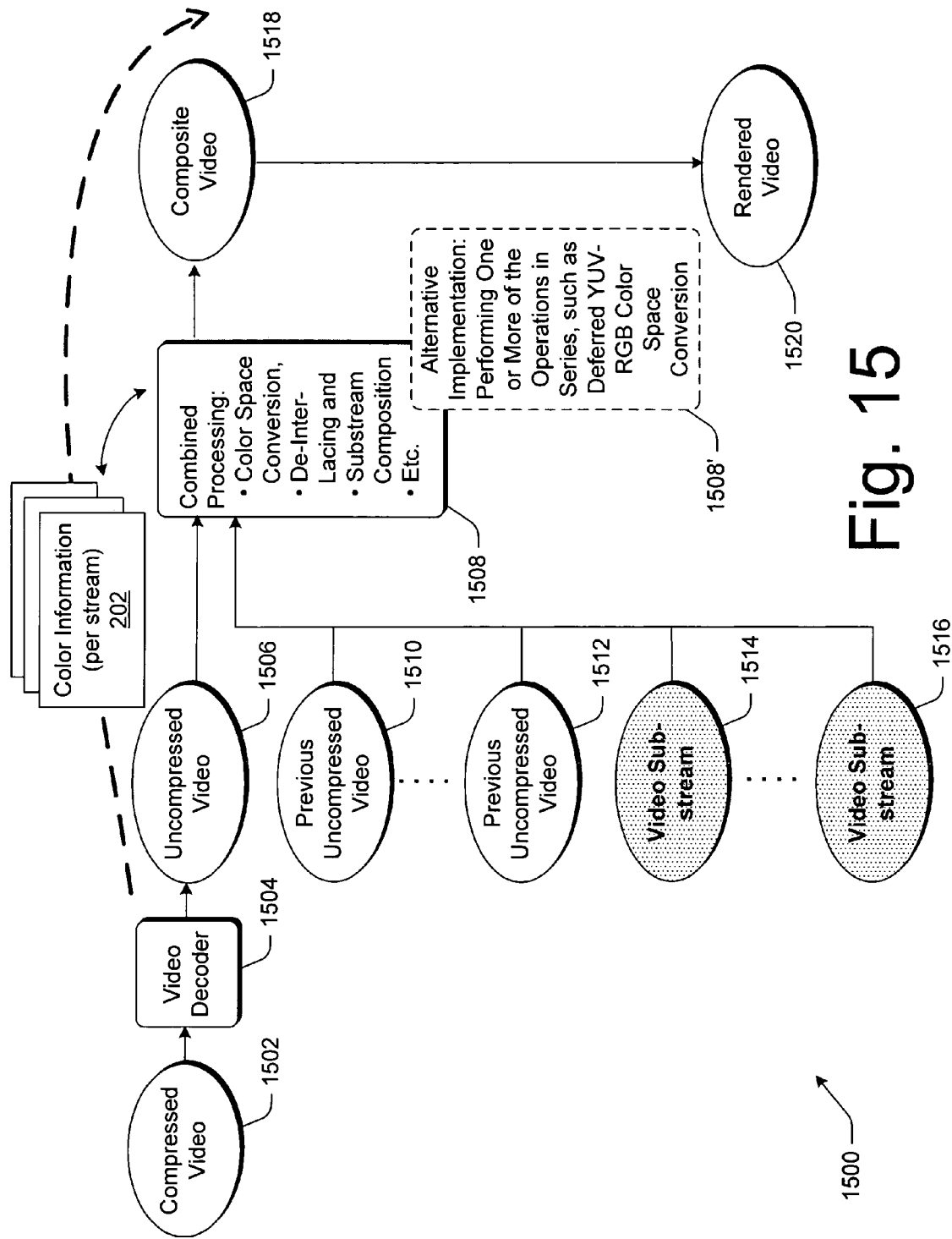
FIGS. 15 and 16 show details of exemplary compositing functionality that can be employed in the system of FIG. 13.
Figure 16:
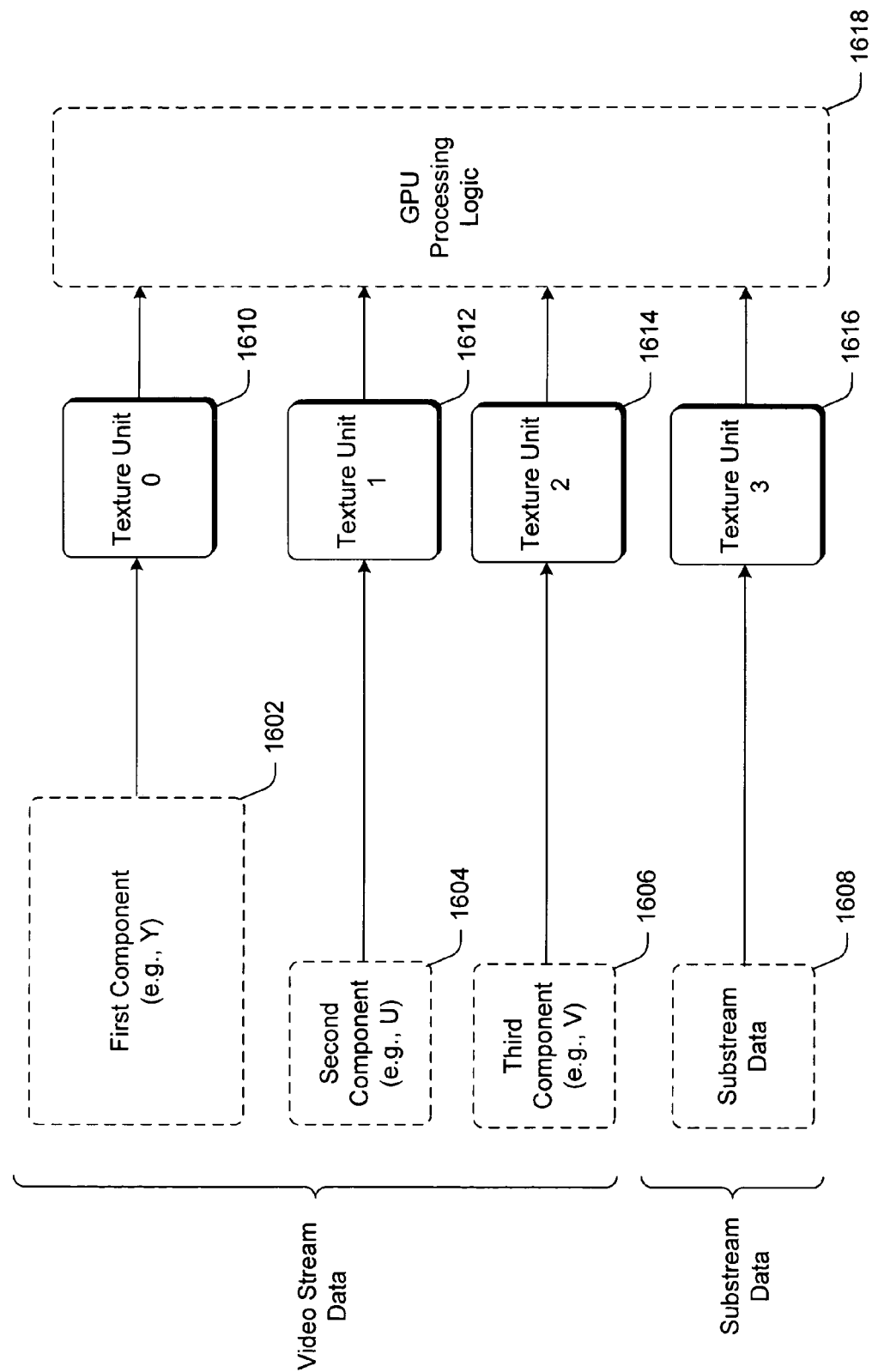

To round out the discussion of the DeinterlaceBltEx functionality, FIGS. 15 and 16 describe how this functionality can combine a compositing operation and a deinterlacing operation together in one operation.

FIG. 15 is an overview of certain operations that can be provided by the system 1300 of FIG. 13 according to one exemplary and non-limiting scenario. This figure shows that compressed image information 1502 is provided to an image decoder 1504 to yield a current frame of uncompressed image information along with CI information. Further, the current frame of uncompressed image information 1506 and CI information is sent to deinterlacing logic 1508, along with one or more previous samples of uncompressed image (e.g., previous uncompressed image information 1510 and 1512). The logic 1508 shown in FIG. 15 also functions to add image sub-stream information (e.g., from image sub-stream information 1514, 1516, etc.) to the image information that is in the process of being deinterlaced. In other words, the logic 1508 effectively combines the deinterlacing operation with the sub-stream compositing operation. Further, as will be described in greater detail below, the logic 1508 executes these two functions such that they can be performed in a single memory read/write operation, rather than in multiple passes. That is, the system 1500 of FIG. 15 requires only a single stage (e.g., a single memory read/write transaction) (that is, requiring, in one exemplary case, only a single read from memory).

The above-described bandwidth efficiency can be achieved by assigning image information (e.g., image information 1506, 1510, 1512, etc.) and the image sub-stream information (e.g., 1514, 1516, etc.) to different respective texturing units employed by the GPU module 1322. In their most common application, texturing units are assigned to image surfaces to be manipulated in the course of a three-dimensional rendering application. For instance, a "texture" generally refers to an image that is "pasted" onto the surface of a geometric primitive (e.g., a triangle) that then forms a part of a three dimensional scene to be rendered. These different texture surfaces are assigned to different so-called texturing units. The system shown in FIG. 15 assigns image information (e.g., 1506, 1510, 1512, etc.) and image sub-stream information (1514, 1516, etc.) to respective texturing units and thus achieves similar efficient performance of the deinterlacing and compositing operations. More specifically, the GPU logic essentially reads and processes information from each of a collection of texturing units at the same time, instead of in a staggered serial fashion. This reduces the bus congestion in the implementing device, and better enables the implementing device to present the image information and associated image sub-stream information at an optimal frame rate.

In other implementations, the logic 1508 can perform other operations, such as color space conversion. For instance, logic 1508 can convert one or more streams of image information from a luma-related color space (e.g., YUV) to an RGB-related color space (e.g., linear or nonlinear RGB). Alternatively, the logic 1508 can convert from one kind of luma-related color space to another kind luma-related color space, or from one kind of RGB-related color space to another kind of RGB-related color space, and so forth. In one exemplary scenario, the logic 1508 can be used to implement aspects of the features shown in FIG. 4 (above), where image information is converted from a luma-related color space to linear RGB, and then processing is subsequently performed on the image information within the linear RGB color space (such as deinterlacing, followed by, or coupled with, any other processing in the linear RGB color space). Stated in other words, the output surface of logic 1508 can be expressed within an RGB-related color space (such as linear RGB).

In another scenario, the output of logic 1508 can process image information within a luma-related color space (e.g., YUV) to produce composite deinterlaced image information 1518, still in the luma-related color space, as opposed to RGB color space. The logic 1508, or some other module (not shown) can then convert the luma-related color information into RGB-related information, which can then be rendered to the display to yield rendered image information 1520. Delaying the conversion of the luma-related color space into the RGB-related color space has potential bandwidth savings. For instance, in one implementation, luma-related color information can be presented using 12 bits. In contrast, in one implementation, RGB information requires 32 bits to represent. Hence, performing such tasks as compositing using luma-related information instead of RGB information cuts down on the bus traffic association with this transaction.

The logic 1508 can perform still other kinds of processing functions, such as image resizing. Yet the logic 1508 need not perform each of the processing operations described above. For instance, if the image information is already in progressive format, the logic 1508 can be dedicated to simply resizing the image information, or performing some other desired operation on the image information (such as color space conversion, etc.).

Further, in other implementations, one or more of the operations can be performed in series, e.g., as separate operations, instead of a single operation. Alternative logic 1508' in FIG. 15 represents such an implementation. For instance, DeinterlaceBlt functionality is adapted to process image information in this manner.

In any event, the color information contained in the CI data structure 202 provides the instructions necessary to convert the image information in a desired manner for a particular application. More specifically, where the logic 1508 processes plural streams of image information, it can consult CI data structures 202 associated each of the streams of image information. Such per-stream CI information 202 can be used to convert the different streams of image information (which may be expressed in different respective color spaces) to a common color space, such as linear RGB color space. This feature is beneficial because it eliminates or reduces the need for storing temporary image information expressed in one or more intermediary color spaces. In the techniques described above, the logic 1508 can receive the input image information, convert it, and write it to memory; for instance, this avoids the need for providing additional composited YUV image information prior to the information being displayed by an output device (e.g., the desktop providing by a personal computer).

The emphasis on the use of the CI information 202 to supply colorspace-related instructions is only illustrative. The CI information 202 provides a wealth of other information that can be used to govern the operations shown in FIG. 15. For instance, the CI information 202 can also be used in the deinterlacing operation to correctly interpolate the corresponding progressive image.

FIG. 16 shows one exemplary technique that can be used to achieve the joint-processing functionality enabled by logic 1508. That is, FIG. 16 explains one technique for performing deinterlacing and compositing in a single operation.

FIG. 16 shows an exemplary organization 1600 of texturing units and associated memory. These elements are used to process the principal image information simultaneously within the image sub-stream information. The memory and texturing 19 units can be implemented using the local memory 1330 associated with the graphics module 1322 shown in FIG. 13, and/or the shared memory 1334.

As noted above, the joint operation of interleaving and compositing can take place while the image information is still in a Y-related color space, such as YUV form. Hence, in this exemplary and non-limiting scenario, the VMR module 1316 allocates portions of memory for storing this Y-related information. A first block 1602 can be allocated to storing Y information, a second block 1604 can be allocated to storing a first chroma component (e.g., U information), and a third block 1606 is allocated to storing a second chroma component (e.g., V information). More bits are allocated to the Y information than the two chroma components. For instance, for an image that contains 720×480 pixels, a block of 720×480 bytes can be allocated to storing the Y information, a block of 360×240 bytes can be allocated to storing the first chroma component, and a block of 360×240 bytes can be allocated to storing the second chroma component. Finally, a block 1608 of memory can be allocated to storing sub-stream information (such as close-captioning information, DVD sub-image display information, graphical icons of various sorts, and so on).

In the exemplary organization 1600 shown in FIG. 16, only four texturing units are shown (1610, 1612, 1614, and 1616). However, other implementations will include more than four units. Texturing unit 1610 is allocated to handling an image input surface associated with memory block 1602 (e.g., the Y information), texturing unit 1612 is allocated to handling an image input surface associated with memory block 1604 (e.g., the first chroma component, e.g., U), and texturing unit 1614 is allocated to handling an image input surface associated with memory block 1606 (e.g., the second chroma component, e.g., V). Texturing unit 1616 is allocated to handling an image input surface associated with memory block 1608 (i.e., the sub-stream information). The memory blocks (Y, chroma1, chroma2, and the sub-stream information) are separate, but need not be contiguous in memory. Additional memory blocks and texturing units can be provided to handle additional image reference samples and/or additional image sub-streams. For instance, an application that includes two previous reference streams would require at least nine texturing units (e.g., three units for the current sample, and six units for the two reference samples).

Finally, FIG. 16 generically shows GPU processing logic 1618 associated with the GPU 1324 of FIG. 15. The GPU processing logic 1618 interacts with the texturing units. The GPU processing logic 1618 can perform deinterlacing, frame rate conversion, and/or other task(s).

The use of YUV-related information to explain the operation of FIG. 16 is merely exemplary. Similar benefits can be gained by performing processing operations within an RGB-related space, such as linear RGB (e.g., in the manner shown in FIG. 4).

E. Exemplary Computer Environment

Figure 17:
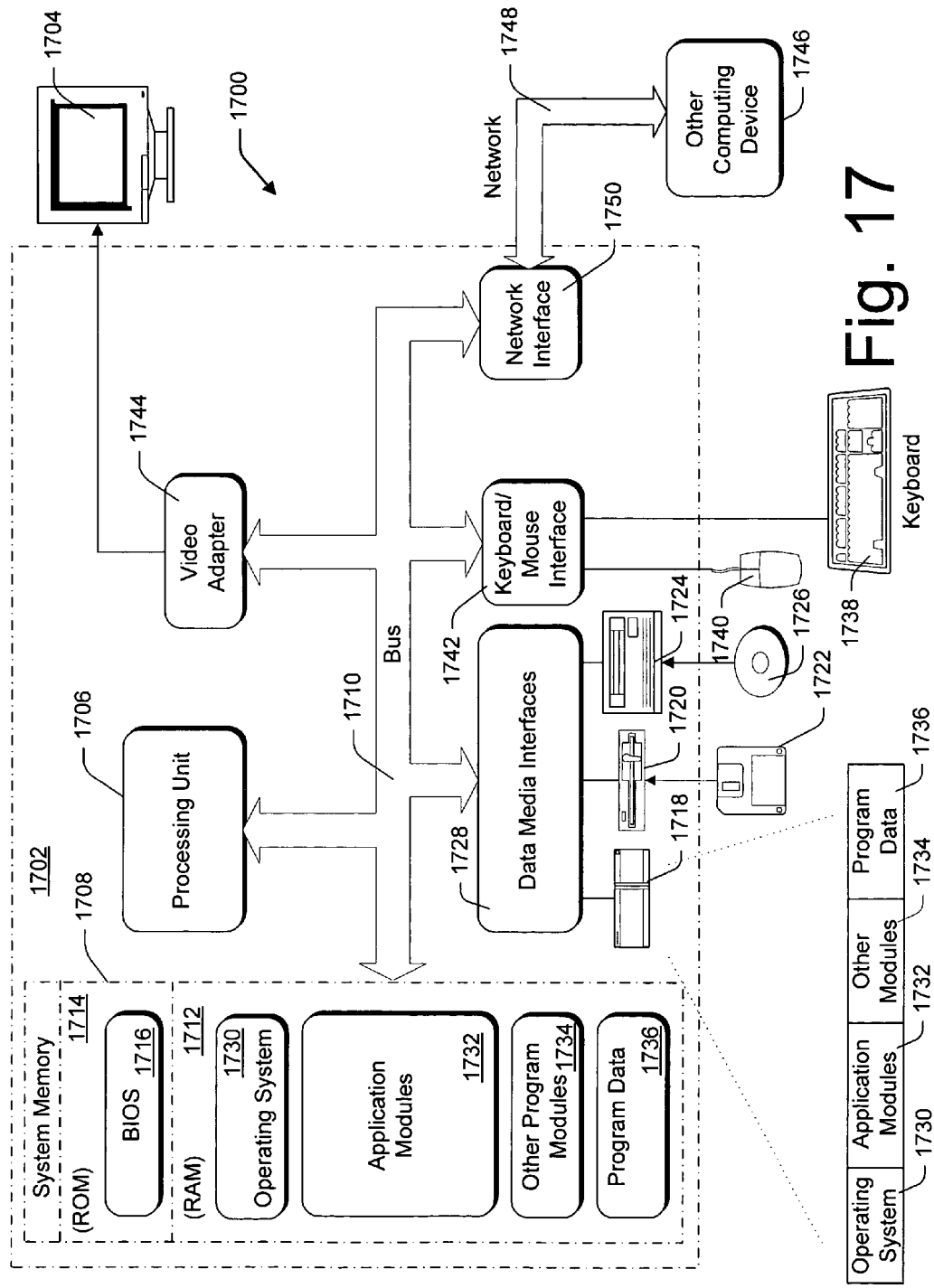
FIG. 17 shows an exemplary computing environment for implementing aspects of the system shown in FIG. 2 et seq.

In one exemplary implementation, aspects of the processing show in the preceding figures can be performed by computing equipment. In this case, FIG. 17 provides information regarding an exemplary computer environment 1700 that can be used to implement aspects of the processing shown in preceding figures.

The computing environment 1700 includes a general purpose type computer 1702 and a display device 1704. However, the computing environment 1700 can include other kinds of computing equipment. For example, although not shown, the computer environment 1700 can include handheld or laptop devices, set top boxes, game consoles, processing functionality integrated into video processing/presentation devices (e.g., televisions, DVRs, etc.), mainframe computers, and so forth. Further, FIG. 17 shows elements of the computer environment 1700 grouped together to facilitate discussion. However, the computing environment 1700 can employ a distributed processing configuration. In a distributed computing environment, computing resources can be physically dispersed throughout the environment.

Exemplary computer 1702 includes one or more processors or processing units 1706, a system memory 1708, and a bus 1710. The bus 1710 connects various system components together. For instance, the bus 1710 connects the processor 1706 to the system memory 1708. The bus 1710 can be implemented using any kind of bus structure or combination of bus structures, including a memory bus or memory controller, a peripheral bus, an accelerated graphics port, and a processor or local bus using any of a variety of bus architectures.

Computer 1702 can also include a variety of computer readable media, including a variety of types of volatile and non-volatile media, each of which can be removable or non-removable. For example, system memory 1708 includes computer readable media in the form of volatile memory, such as random access memory (RAM) 1712, and non-volatile memory, such as read only memory (ROM) 1714. ROM 1714 includes an input/output system (BIOS) 1716 that contains the basic routines that help to transfer information between elements within computer 1702, such as during start-up. RAM 1712 typically contains data and/or program modules in a form that can be quickly accessed by processing unit 1706.

Other kinds of computer storage media include a hard disk drive 1718 for reading from and writing to a non-removable, non-volatile magnetic media, a magnetic disk drive 1720 for reading from and writing to a removable, non-volatile magnetic disk 1722 (e.g., a "floppy disk"), and an optical disk drive 1724 for reading from and/or writing to a removable, non-volatile optical disk 1726 such as a CD-ROM, DVD-ROM, or other optical media. The hard disk drive 1718, magnetic disk drive 1720, and optical disk drive 1724 are each connected to the system bus 1710 by one or more data media interfaces 1728. Alternatively, the hard disk drive 1718, magnetic disk drive 1720, and optical disk drive 1724 can be connected to the system bus 1710 by a SCSI interface (not shown), or other coupling mechanism. Although not shown, the computer 1702 can include other types of computer readable media, such as magnetic cassettes or other magnetic storage devices, flash memory cards, CD-ROM, digital versatile disks (DVD) or other optical storage, electrically erasable programmable read-only memory (EEPROM), etc.

Generally, the above-identified computer readable media provide non-volatile storage of computer readable instructions, data structures, program modules, and other data for use by computer 1702. For instance, the readable media can store the operating system 1730, application modules 1732, other program modules 1734, and program data 1736.

The computer environment 1700 can include a variety of input devices. For instance, the computer environment 1700 includes the keyboard 1738 and a pointing device 1740 (e.g., a "mouse") for entering commands and information into computer 1702. The computer environment 1700 can include other input devices (not illustrated), such as a microphone, joystick, game pad, satellite dish, serial port, scanner, card reading devices, digital or video camera, etc. Input/output interfaces 1742 couple the input devices to the processing unit 1706. More generally, input devices can be coupled to the computer 1702 through any kind of interface and bus structures, such as a parallel port, serial port, game port, universal serial bus (USB) port, etc.

The computer environment 1700 also includes the display device 1704. A video adapter 1744 couples the display device 1704 to the bus 1710. In addition to the display device 1704, the computer environment 1700 can include other output peripheral devices, such as speakers (not shown), a printer (not shown), etc.

Computer 1702 operates in a networked environment using logical connections to one or more remote computers, such as a remote computing device 1746. The remote computing device 1746 can comprise any kind of computer equipment, including a general purpose personal computer, portable computer, a server, a game console, a network extension device, and so forth. Remote computing device 1746 can include all of the features discussed above with respect to computer 1702, or some subset thereof.

Any type of network 1748 can be used to couple the computer 1702 with remote computing device 1746, such as a WAN, a LAN, etc. The computer 1702 couples to the network 1748 via network interface 1750, which can utilize broadband connectivity, modem connectivity, DSL connectivity, or other connection strategy. Although not illustrated, the computing environment 1700 can provide wireless communication functionality for connecting computer 1702 with remote computing device 1746 (e.g., via modulated radio signals, modulated infrared signals, etc.).

In closing, a number of examples were presented in this disclosure in the alternative (e.g., case A or case B). In addition, this disclosure encompasses those cases which combine alternatives in a single implementation (e.g., case A and case B), even though this disclosure may not have expressly mention these conjunctive cases in every instance.

Moreover, a number of features were described herein by first identifying exemplary problems that these features can address. This manner of explication does not constitute an admission that others have appreciated and/or articulated the problems in the manner specified herein. Appreciation and articulation of the problems present in the video coding art is to be understood as part of the present invention.

More generally, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for processing image information having color content expressed in a prescribed format, comprising:
   providing a color information data structure that contains color information that defines at least one aspect of the prescribed format;
   passing the color information data structure to at least one functional component used to process the image information, along with the image information; and
   processing the image information at said at least one functional component based on the color information in the color information data structure,
   wherein the color information data structure comprises an image light field which conveys information comprising gamma, brightness, and contrast associated with the image information.

2. The method according to claim 1, wherein said at least one functional component belongs to a group of functional components defining a video processing pipeline, wherein the color information data structure is passed down the video processing pipeline for use by downstream functional components.

3. The method according to claim 2, wherein the video processing pipeline performs the operations of:
   converting input image information in a luma-related color space into linear image information within an RGB-related color space; and
   performing processing on the linear image information in the RGB-related color space to produce processed information.

4. The method according to claim 3, wherein the converting also involves transforming the input image information from an interlaced format into a progressive format prior to the processing operation.

5. The method according to claim 3, wherein the video processing pipeline further performs the operations of:
   converting the processed information into nonlinear image information within a luma-related color space.

6. The method according to claim 5, wherein the converting of the processed information also involves transforming the processed information from a progressive format into an interlaced format.

7. The method according to claim 2, wherein the video processing pipeline performs color conversion, and wherein the color information in the color information data structure governs the color conversion.

8. The apparatus according to claim 1, further comprising initializing unknown values within the color information data structure to a prescribed default value.

9. The method according to claim 1, wherein said at least one functional component further determines at least one other aspect of the prescribed format and adds said at least one other aspect to at least one unknown value in the color information data structure.

10. The method according to claim 1, wherein the passing of the color information data structure comprises passing the color information data structure in an unused field of an existing data structure.

11. The method according to claim 1, further comprising setting a flag which indicates that said at least one functional component has the capacity to process the color information data structure.

12. The method according to claim 1, wherein the color information data structure comprises a video transfer function field which conveys information regarding the transfer function used to convert linear image information into nonlinear image information, and/or vice versa.

13. The method according to claim 1, wherein the color information data structure comprises a color primaries field which conveys color primaries associated with the image information.

14. The method according to claim 1, wherein the color information data structure comprises a transfer matrix field which conveys information regarding a transfer matrix that can be used to modify the color space of the image information.

15. The method according to claim 1, wherein the color information data structure comprises a nominal range field which conveys information regarding potential toe room and head room associated with the image information.

16. The method according to claim 1, wherein the color information data structure comprises a video chroma sampling field which indicates the manner in which chroma samples in the image information are sampled and aligned relative to associated luma samples.

17. The method according to claim 1, wherein the color information data structure comprises:
   a video transfer function field which conveys information regarding the transfer function used to convert linear image information into nonlinear image information, and/or vice versa;
   a color primaries field which conveys color primaries associated with the image information;
   a transfer matrix field that can be used to modify the color space of the image information;
   a nominal range field which conveys information regarding potential toe room and head room associated with the image information; and
   a video chroma sampling field which indicates the manner in which chroma samples in the image information are sampled and aligned relative to associated luma samples.

18. One or more computer-readable storage media including, stored thereon, processor-executable instructions for implementing the method of claim 1.

19. An apparatus including a processor and one or more computer-readable storage media comprising computer executable instructions configured to perform each of the providing, passing and processing of claim 1.

20. An apparatus including a processor and one or more computer-readable storage media comprising computer executable instructions configured to perform each of the providing, passing and processing using the color information data structure of claim 17.

21. A system for processing image information having color content expressed in a prescribed format, comprising:
   plural functional components defining a video processing pipeline,
   wherein each of the plural functional components includes logic configured to process a color information data structure that contains color information that defines at least one aspect of the prescribed format; and
   wherein the color information data structure comprises:
      an image light field which conveys an intended viewing condition associated with the image information;
      a nominal range field which conveys information regarding potential toe room and head room associated with the image information; and
      a video chroma sampling field which indicates the manner in which chroma samples in the information are sampled and aligned relative to associated luma samples.

22. The system according to claim 21, wherein the color information data structure further comprises at least one of:
   a video transfer function field which conveys information regarding the transfer function used to convert linear image information into nonlinear image information, and/or vice versa;
   a color primaries field which conveys color primaries associated with the image information; or
   a transfer matrix field that can be used to modify the color space of the image information.

23. A method comprising:
   providing a color information data structure that contains color information that defines at least one aspect of a prescribed format;
   passing the color information data structure to at least one functional component used to process the image information, along with the image information; and
   processing the image information at said at least one functional component based on the color information in the color information data structure,
   wherein the color information data structure comprises:
      a video transfer function field which conveys information regarding the transfer function used to convert linear image information into nonlinear image information, and/or vice versa;
      a color primaries field which conveys color primaries associated with the image information;
      an image light field which conveys an intended viewing condition associated with the image information;
      a transfer matrix field that can be used to modify the color space of the image information;
      a nominal range field which conveys information regarding potential toe room and head room associated with the image information; and
      a video chroma sampling field which indicates the manner in which chroma samples in the image information are sampled and aligned relative to associated luma samples.

* * * * *